United States Patent
Hong

(10) Patent No.: US 12,063,691 B2
(45) Date of Patent: Aug. 13, 2024

(54) RANDOM ACCESS METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 446 days.

(21) Appl. No.: 17/594,397

(22) PCT Filed: Apr. 15, 2019

(86) PCT No.: PCT/CN2019/082609
§ 371 (c)(1),
(2) Date: Oct. 14, 2021

(87) PCT Pub. No.: WO2020/210929
PCT Pub. Date: Oct. 22, 2020

(65) Prior Publication Data
US 2022/0183073 A1  Jun. 9, 2022

(51) Int. Cl.
*H04W 74/08* (2024.01)
*H04W 74/00* (2009.01)
*H04W 74/0833* (2024.01)
*H04W 16/14* (2009.01)

(52) U.S. Cl.
CPC ..... *H04W 74/0833* (2013.01); *H04W 74/008* (2013.01); *H04W 16/14* (2013.01)

(58) Field of Classification Search
CPC ...... H04W 74/00; H04W 74/02; H04W 74/08
See application file for complete search history.

(56) References Cited

U.S. PATENT DOCUMENTS

2020/0146054 A1* 5/2020 Jeon ............ H04L 5/0053

FOREIGN PATENT DOCUMENTS

| CN | 107333222 A | 11/2017 |
|---|---|---|
| CN | 108476480 A | 8/2018 |
| CN | 109565880 A | 4/2019 |
| EP | 3407662 A1 | 11/2018 |

(Continued)

OTHER PUBLICATIONS

ISA State Intellectual Property Office of the People's Republic of China, International Search Report Issued in Application No. PCT/CN2019/082609, Jan. 7, 2020, WIPO, 4 pages.

(Continued)

*Primary Examiner* — Tu X Nguyen
(74) *Attorney, Agent, or Firm* — Syncoda LLC; Feng Ma

(57) ABSTRACT

A method for random access includes: after sending a random access preamble, monitoring a random access response message in a random access response window, wherein a length of the random access response window exceeds a preset value, the random access response message includes a reserved bit that indicates a receiving terminal of the random access response message; reading a value of the reserved bit in the random access response message; determining the receiving terminal of the random access response message according to the value of the reserved bit; and when determining that the receiving terminal is the first user equipment, sending a Message3 based on a message content of the random access response message.

17 Claims, 17 Drawing Sheets

(56) References Cited

FOREIGN PATENT DOCUMENTS

| | | |
|---|---|---|
| EP | 3439365 A1 | 2/2019 |
| EP | 3917232 A1 | 12/2021 |
| WO | 2015146638 A1 | 10/2015 |
| WO | 2017136458 A2 | 8/2017 |
| WO | 2017171301 A1 | 10/2017 |
| WO | 2018164553 A2 | 9/2018 |
| WO | 2018209956 A1 | 11/2018 |
| WO | 2020126892 A1 | 6/2020 |

OTHER PUBLICATIONS

State Intellectual Property Office of the People's Republic of China, Office Action and Search Report Issued in Application No. 2019800006390, Sep. 2, 2022, 7 pages. (Submitted with Partial Translation).
European Patent Office, Extended European Search Report Issued in Application No. 19925122.4, Oct. 10, 2022, Germany, 12 pages.
ZTE Corporation, Sanechips, "Considerations on RAR window expansion for NR-U",3GPP TSG RAN WG2 NR #105bis Meeting, R2-1903538, Xi'an, China, Apr. 8-Apr. 12, 2019, 2 pages.
Intellectual property India, Office Action Issued in Application No. 202147052030, Mar. 29, 2022, 7 pages.
ISA State Intellectual Property Office of the People's Republic of China, Written Opinion of the International Searching Authority Issued in Application No. PCT/CN2019/082609, Jan. 7, 2020, WIPO, 7 pages.

\* cited by examiner

| R (Reserved bit) | Timing Advance Command | Byte |
| Timing Advance Command | UL Grant (Uplink Grant) | Byte |
| UL Grant || Byte |
| UL Grant || Byte |
| UL Grant || Byte |
| Temporary C-RNTI (Temporary Cell Radio Network Temporary Identification) || Byte |
| Temporary C-RNTI (Temporary Cell Radio Network Temporary Identification) || Byte |

RANDOM ACCESS METHOD AND APPARATUS

CROSS-REFERENCE TO RELATED APPLICATION

The present application is a national stage of International Application No. PCT/CN2019/082609 filed on Apr. 15, 2019, the disclosure of which is hereby incorporated by reference in its entirety.

TECHNICAL FIELD

The present disclosure relates to the field of communication technologies, and in particular, to a random access method and apparatus.

BACKGROUND

In order to expand the new radio (NR) technology of the fifth generation (5G) mobile communication technology to use unlicensed frequency bands, the third generation partnership project (3GPP) has adopted a study on preforming NR-based access to an unlicensed spectrum, so that the NR can meet regulatory requirements of unlicensed frequency bands. Based on study conclusions, user equipments (UEs) and base stations supporting new radio access to unlicensed spectrum (NR-U) all need to comply with the regulatory requirements of unlicensed frequency bands, including a listen-before-talk (LBT) channel competition access mechanism.

When a UE supporting NR-U initiates a random access process, after a base station supporting NR-U receives message 1 sent by the UE, the base station may encounter continuous failure of LBT due to fierce competition for unlicensed frequency band resources, which causes the base station cannot send a random access response (RAR) in a random access response window. In related art, in order to increase the opportunities for RAR transmission, operators have proposed a scheme to increase a length of the random access response window. However, when the length of the random access response window exceeds 10 ms, a confusion for random access radio network temporary identifiers (RA-RNTIs) may be caused. Therefore, a technical solution needs to be provided to solve the above-mentioned RA-RNTI confusion.

SUMMARY

In order to overcome the problems in the relate art, examples of the present disclosure provide a method and an apparatus for random access, in order that when a length of the random access response window is larger than one radio frame, the UE that needs to receive RAR can still be uniquely identified, thereby improving the access success rate for the UE which supports NR-U performing random access when competition for unlicensed frequency band resources is fierce.

According to a first aspect of the examples of the present disclosure, a method for random access is provided, applied to a first user equipment supporting New Radio access to unlicensed spectrum. The method includes:

after sending a random access preamble, monitoring a random access response message in a random access response window, wherein a length of the random access response window exceeds a preset value, the random access response message includes a reserved bit, and the reserved bit is used to indicate a receiving terminal of the random access response message;

reading a value of the reserved bit in the random access response message;

determining the receiving terminal of the random access response message according to the value of the reserved bit; and when determining that the receiving terminal is the first user equipment, sending a Message3 based on message content of the random access response message.

In an example, when a receiving position where the random access response message is monitored belongs to overlapping transmission units, and the overlapping transmission units are used to represent overlapping transmission units of two random access response windows, determining the receiving terminal of the random access response message according to the value of the reserved bit includes:

when the receiving position is first Q transmission units of the random access response window, and the value of the reserved bit indicates that the receiving terminal is a user equipment of a current radio frame, determining that the receiving terminal of the random access response message is the first user equipment;

when the receiving position is the first Q transmission units of the random access response window, and the value of the reserved bit indicates that the receiving terminal is the user equipment of a previous radio frame, determine that the receiving terminal of the random access response message is not the first user equipment;

when the receiving position is last Q transmission units of the random access response window, and the value of the reserved bit indicates that the receiving terminal is the user equipment of the previous radio frame, determining that the receiving terminal of the random access response message is the first user equipment; and when the receiving position is the last Q transmission units of the random access response window, and the value of the reserved bit indicates that the receiving terminal is the user equipment of the current radio frame, determining that the receiving terminal of the random access response message is not the first user equipment, wherein both of the first Q transmission units and the last Q transmission units belong to overlapping transmission units.

In an example, when a receiving position where the random access response message is monitored belongs to overlapping transmission units, determining the receiving terminal of the random access response message according to the value of the reserved bit includes:

when the value of the reserved bit indicates that the receiving terminal is the user equipment of the current radio frame, determining that the receiving terminal of the random access response message is the first user equipment.

In an example, the method further includes:

when determining that the receiving terminal is not the first user equipment, determining that the random access fails.

According to a second aspect of the examples of the present disclosure, a method for random access is provided, applied to a first user equipment supporting New Radio access to unlicensed spectrum. The method includes:

after sending a random access preamble, monitoring a random access response message in a random access response window, wherein a length of the random access response window exceeds a preset value, the random access response message includes a reserved bit, and the reserved bit is used to indicate a receiving terminal of the random access response message;

when a receiving position where the random access response message is monitored belongs to overlapping transmission units, reading a value of the reserved bit in the random access response message, wherein the overlapping transmission units are used to represent overlapping transmission units of two random access response windows;

determining the receiving terminal of the random access response message according to the value of the reserved bit; and when determining that the receiving terminal is the first user equipment, sending a Message3 based on message content of the random access response message.

In an example, the method further includes:

when the receiving position where the random access response message is monitored does not belong to overlapping transmission units, refraining the operation of reading the value of the reserved bit in the random access response message, and determining that the receiving terminal of the random access response message is the first user equipment.

In an example, determining the receiving terminal of the random access response message according to the value of the reserved bit includes:

when the receiving position is first Q transmission units of the random access response window, and the value of the reserved bit indicates that the receiving terminal is a user equipment of a current radio frame, determining that the receiving terminal of the random access response message is the first user equipment;

when the receiving position is the first Q transmission units of the random access response window, and the value of the reserved bit indicates that the receiving terminal is the user equipment of a previous radio frame, determining that the receiving terminal of the random access response message is not the first user equipment;

when the receiving position is last Q transmission units of the random access response window, and the value of the reserved bit indicates that the receiving terminal is the user equipment of the previous radio frame, determining that the receiving terminal of the random access response message is the first user equipment; and when the receiving position is the last Q transmission units of the random access response window, and the value of the reserved bit indicates that the receiving terminal is the user equipment of the current radio frame, determining that the receiving terminal of the random access response message is not the first user equipment;

wherein both of the first Q transmission units and the last Q transmission units belong to overlapping transmission units.

In an example, the method further includes:

when determining that the receiving terminal is not the first user equipment, determining that the random access fails.

According to a third aspect of the examples of the present disclosure, a method for random access is provided, applied to a first user equipment supporting New Radio access to unlicensed spectrum. The method includes:

after sending a random access preamble, monitoring a random access response message in a random access response window, wherein a length of the random access response window exceeds a preset value;

when a receiving position where the random access response message is monitored belongs to overlapping transmission units, reading the reserved bit in the random access response message, wherein the reserved bit is used to indicate a receiving terminal of the random access response message, and the overlapping transmission units are used to represent overlapping transmission units of two random access response windows;

determining the receiving terminal of the random access response message according to the value of the reserved bit; and when determining that the receiving terminal is the first user equipment, sending a Message3 based on message content of the random access response message.

In an example, the method further includes:

when the receiving position where the random access response message is monitored does not belong to overlapping transmission units, refraining the operation of reading the value of the reserved bit in the random access response message, and determining that the receiving terminal of the random access response message is the first user equipment.

In an example, determining the receiving terminal of the random access response message according to the value of the reserved bit includes:

when the receiving position is first Q transmission units of the random access response window, and the value of the reserved bit indicates that the receiving terminal is a user equipment of a current radio frame, determining that the receiving terminal of the random access response message is the first user equipment;

when the receiving position is the first Q transmission units of the random access response window, and the value of the reserved bit indicates that the receiving terminal is the user equipment of a previous radio frame, determining that the receiving terminal of the random access response message is not the first user equipment;

when the receiving position is last Q transmission units of the random access response window, and the value of the reserved bit indicates that the receiving terminal is the user equipment of the previous radio frame, determining that the receiving terminal of the random access response message is the first user equipment; and when the receiving position is the last Q transmission units of the random access response window, and the value of the reserved bit indicates that the receiving terminal is the user equipment of the current radio frame, determining that the receiving terminal of the random access response message is not the first user equipment, wherein both of the first Q transmission units and the last Q transmission units belong to overlapping transmission units.

In an example, the method further includes:
when the receiving terminal is not the first user equipment, determining that the random access fails.

According to a fourth aspect of the examples of the present disclosure, a method for random access is provided, applied to a base station supporting New Radio access to unlicensed spectrum. The method includes:
after receiving a random access preamble sent by a user equipment, determining a sending position for sending a random access response message, wherein the random access response message includes a reserved bit, and the reserved bit is used to indicate a receiving terminal of the random access response message;
when the sending position belongs to overlapping transmission units of the random access response window, setting a value of the reserved bit in the random access response message to a value that can indicate the receiving terminal of the random access response message; and
sending a generated random access response message.

In an example, when the sending position belongs to overlapping transmission units of the random access response window, setting a value of the reserved bit in the random access response message to a value that can indicate the receiving terminal of the random access response message includes:
when the overlapping transmission units to which the receiving position belong is within first Q transmission units of the random access response window, setting the value of the reserved bit to a value indicating that the receiving terminal is the user equipment of the current radio frame; and
when the overlapping transmission unit to which the receiving position belong is within last Q transmission units of the random access response window, setting the value of the reserved bit to a value indicating that the receiving terminal is the user equipment of the previous radio frame,
wherein both of the first Q transmission units and the last Q transmission units belong to overlapping transmission units.

In an example, the method further includes:
when the sending position does not belong to the overlapping transmission units in the random access response window, refraining using the reserved bit in the random access response message to indicate any information.

According to a fifth aspect of the examples of the present disclosure, a method for random access is provided, applied to a base station supporting New Radio access to unlicensed spectrum. The method includes:
after receiving a random access preamble sent by a user equipment, setting a value of a reserved bit in the random access response message to a value indicating a receiving terminal of the random access response message; and
sending a generated random access response message.

In an example, setting a value of a reserved bit in the random access response message to a value indicating a receiving terminal of the random access response message includes:
when the overlapping transmission unit to which a receiving position belong is within first Q transmission units of the random access response window, setting the value of the reserved bit to a value indicating that the receiving terminal is the user equipment of the current radio frame; and
when the overlapping transmission unit to which the receiving position belongs is within last Q transmission units of the random access response window, setting the value of the reserved bit to a value indicating that the receiving terminal is the user equipment of the previous radio frame,
wherein both of the first Q transmission units and the last Q transmission units belong to overlapping transmission units.

In an example, the method further includes:
when the sending position does not belong to the overlapping transmission units in the random access response window, setting the value of the reserved bit in the random access response message to a value indicating that the receiving terminal of the random access response message is the user equipment of the current radio frame.

According to a sixth aspect of the examples of the present disclosure, an apparatus for random access is provided, applied to a first user equipment supporting New Radio access to unlicensed spectrum. The apparatus includes:
a first monitoring module configured to, after sending a random access preamble, monitor a random access response message in a random access response window, wherein a length of the random access response window exceeds a preset value, the random access response message includes a reserved bit, and the reserved bit is used to indicate a receiving terminal of the random access response message;
a first reading module configured to read a value of the reserved bit in the random access response message;
a first determining module configured to determine the receiving terminal of the random access response message according to the value of the reserved bit; and
a first sending module configured to, when determining that the receiving terminal is the first user equipment, send a Message3 based on message content of the random access response message.

In an example, when a receiving position where the random access response message is monitored belongs to overlapping transmission units, and the overlapping transmission units are used to represent overlapping transmission units of two random access response windows,
the first determining module includes:
a first determining sub-module configured to, when the receiving position is first Q transmission units of the random access response window, and the value of the reserved bit indicates that the receiving terminal is a user equipment of a current radio frame, determine that the receiving terminal of the random access response message is the first user equipment;
a second determining sub-module configured to, when the receiving position is the first Q transmission units of the random access response window, and the value of the reserved bit indicates that the receiving terminal is the user equipment of a previous radio frame, determine that the receiving terminal of the random access response message is not the first user equipment;
a third determining sub-module configured to, when the receiving position is last Q transmission units of the random access response window, and the value of the reserved bit indicates that the receiving terminal is the user equipment of the previous radio frame, determine that the receiving terminal of the random access response message is the first user equipment; and
a fourth determining sub-module configured to, when the receiving position is the last Q transmission units of the random access response window, and the value of the reserved bit indicates that the receiving terminal is the user equipment of the current radio frame, determine that the receiving terminal of the random access response message is not the first user equipment, wherein both of the first Q transmission units and the last Q transmission units belong to overlapping transmission units.

In an example, when a receiving position where the random access response message is monitored belongs to overlapping transmission units, the first determining module includes:

a fifth determining sub-module configured to, when the value of the reserved bit indicates that the receiving terminal is the user equipment of the current radio frame, determine that the receiving terminal of the random access response message is the first user equipment.

In an example, the apparatus further includes:

a second determining module configured to, when determining that the receiving terminal is not the first user equipment, determine that the random access fails.

According to a seventh aspect of the examples of the present disclosure, an apparatus for random access is provided, applied to a first user equipment supporting New Radio access to unlicensed spectrum. The apparatus includes:

a second monitoring module configured to, after sending a random access preamble, monitor a random access response message in a random access response window, wherein a length of the random access response window exceeds a preset value, the random access response message includes a reserved bit, and the reserved bit is used to indicate a receiving terminal of the random access response message;

a second reading module configured to, when a receiving position where the random access response message is monitored belongs to overlapping transmission units, read a value of the reserved bit in the random access response message, wherein the overlapping transmission units are used to represent overlapping transmission units of two random access response windows;

a third determining module configured to determine the receiving terminal of the random access response message according to the value of the reserved bit; and a second sending module configured to, when determining that the receiving terminal is the first user equipment, send a Message3 based on message content of the random access response message.

In an example, the apparatus further includes:

a fourth determining module configured to, when the receiving position where the random access response message is monitored does not belong to overlapping transmission units, refrain the operation of reading the value of the reserved bit in the random access response message, and determine that the receiving terminal of the random access response message is the first user equipment.

In an example, the third determining module includes:

a sixth determining sub-module configured to, when the receiving position is first Q transmission units of the random access response window, and the value of the reserved bit indicates that the receiving terminal is a user equipment of a current radio frame, determine that the receiving terminal of the random access response message is the first user equipment;

a seventh determining sub-module configured to, when the receiving position is the first Q transmission units of the random access response window, and the value of the reserved bit indicates that the receiving terminal is the user equipment of a previous radio frame, determine that the receiving terminal of the random access response message is not the first user equipment;

an eighth determining sub-module configured to, when the receiving position is last Q transmission units of the random access response window, and the value of the reserved bit indicates that the receiving terminal is the user equipment of the previous radio frame, determine that the receiving terminal of the random access response message is the first user equipment; and a ninth determining sub-module configured to, when the receiving position is the last Q transmission units of the random access response window, and the value of the reserved bit indicates that the receiving terminal is the user equipment of the current radio frame, determine that the receiving terminal of the random access response message is not the first user equipment, wherein both of the first Q transmission units and the last Q transmission units belong to overlapping transmission units.

In an example, the apparatus further includes:

a fifth determining module configured to, when determining that the receiving terminal is not the first user equipment, determine that the random access fails.

According to an eighth aspect of the examples of the present disclosure, an apparatus for random access is provided, applied to a first user equipment supporting New Radio access to unlicensed spectrum. The apparatus includes:

a third monitoring module configured to, after sending a random access preamble, monitor a random access response message in a random access response window, wherein a length of the random access response window exceeds a preset value;

a third reading module configured to, when a receiving position where the random access response message is monitored belongs to overlapping transmission units, read the reserved bit in the random access response message, wherein the reserved bit is used to indicate a receiving terminal of the random access response message, and the overlapping transmission units are used to represent overlapping transmission units of two random access response windows;

a third reading module configured to determine the receiving terminal of the random access response message according to the value of the reserved bit; and a third sending module configured to, when determining that the receiving terminal is the first user equipment, send a Message3 based on message content of the random access response message.

In an example, the apparatus further includes:

a seventh determining module configured to, when the receiving position where the random access response message is monitored does not belong to overlapping transmission units, refrain the operation of reading the value of the reserved bit in the random access response message, and determine that the receiving terminal of the random access response message is the first user equipment.

In an example, the sixth determining module includes:

a tenth determining sub-module configured to, when the receiving position is first Q transmission units of the random access response window, and the value of the reserved bit indicates that the receiving terminal is a user equipment of a current radio frame, determine that the receiving terminal of the random access response message is the first user equipment;

an eleventh determining sub-module configured to, when the receiving position is the first Q transmission units of the random access response window, and the value of the reserved bit indicates that the receiving terminal is the user equipment of a previous radio frame, determine that the receiving terminal of the random access response message is not the first user equipment;

a twelfth determining sub-module configured to, when the receiving position is last Q transmission units of the random access response window, and the value of the reserved bit indicates that the receiving terminal is the user equipment of the previous radio frame, determine that the receiving terminal of the random access response message is the first user equipment; and a thirteen determining sub-module configured to, when the receiving position is the last Q transmission units of the random access response window, and the value of the reserved bit indicates that the receiving terminal is the user equipment of the current radio frame, determine that the receiving terminal of the random access response message is not the first user equipment, wherein both of the first Q transmission units and the last Q transmission units belong to overlapping transmission units.

In an example, the apparatus further includes:

an eighth determining module configured to, when the receiving terminal is not the first user equipment, determine that the random access fails.

According to a ninth aspect of the examples of the present disclosure, an apparatus for random access is provided, applied to a base station supporting New Radio access to unlicensed spectrum. The apparatus includes:

a ninth determining module configured to, after receiving a random access preamble sent by a user equipment, determine a sending position for sending a random access response message, wherein the random access response message includes a reserved bit, and the reserved bit is used to indicate a receiving terminal of the random access response message;

a first setting module configured to, when the sending position belongs to overlapping transmission units of the random access response window, set a value of the reserved bit in the random access response message to a value that can indicate the receiving terminal of the random access response message; and a fourth sending module configured to send a generated random access response message.

In an example, the first setting module includes:

a first setting sub-module configured to, when the overlapping transmission units to which the receiving position belong is within first Q transmission units of the random access response window, set the value of the reserved bit to a value indicating that the receiving terminal is the user equipment of the current radio frame; and a second setting sub-module configured to, when the overlapping transmission unit to which the receiving position belongs is within last Q transmission units of the random access response window, set the value of the reserved bit to a value indicating that the receiving terminal is the user equipment of the previous radio frame, wherein both of the first Q transmission units and the last Q transmission units belong to overlapping transmission units.

In an example, the apparatus further includes:

a second setting module configured to, when the sending position does not belong to the overlapping transmission units in the random access response window, refrain using the reserved bit in the random access response message to indicate any information.

According to a tenth aspect of the examples of the present disclosure, an apparatus for random access is provided, applied to a base station supporting New Radio access to unlicensed spectrum. The apparatus includes:

a third setting module configured to, after receiving a random access preamble sent by a user equipment, set a value of a reserved bit in the random access response message to a value indicating a receiving terminal of the random access response message; and a fifth sending module configured to send a generated random access response message.

In an example, the third setting module includes:

a third setting sub-module configured to, when the overlapping transmission unit to which a receiving position belong is within first Q transmission units of the random access response window, set the value of the reserved bit to a value indicating that the receiving terminal is the user equipment of the current radio frame; and a fourth setting sub-module configured to, when the overlapping transmission unit to which the receiving position belong is within last Q transmission units of the random access response window, set the value of the reserved bit to a value indicating that the receiving terminal is the user equipment of the previous radio frame, wherein both of the first Q transmission units and the last Q transmission units belong to overlapping transmission units.

In an example, the apparatus further includes:

a fourth setting module configured to, when the sending position does not belong to the overlapping transmission units in the random access response window, set the value of the reserved bit in the random access response message to a value indicating that the receiving terminal of the random access response message is the user equipment of the current radio frame.

According to an eleventh aspect of the examples of the present disclosure, an apparatus for random access is provided, applied to a user equipment supporting New Radio access to unlicensed spectrum. The apparatus includes:

a processor;

a memory for storing processor executable instructions;

wherein the processor is configured to:

after sending a random access preamble, monitor a random access response message in a random access response window, wherein a length of the random access response window exceeds a preset value, the random access response message includes a reserved bit, and the reserved bit is used to indicate a receiving terminal of the random access response message;

read a value of the reserved bit in the random access response message;

determine the receiving terminal of the random access response message according to the value of the reserved bit; and when determining that the receiving terminal is the first user equipment, send a Message3 based on message content of the random access response message.

According to a twelfth aspect of the examples of the present disclosure, an apparatus for random access is provided, applied to a user equipment supporting New Radio access to unlicensed spectrum. The apparatus includes:

a processor;

a memory for storing processor executable instructions; wherein the processor is configured to:

after sending a random access preamble, monitor a random access response message in a random access response window, wherein a length of the random access response window exceeds a preset value, the random access response message includes a reserved bit, and the reserved bit is used to indicate a receiving terminal of the random access response message;

when a receiving position where the random access response message is monitored belongs to overlapping transmission units, read a value of the reserved bit in the random access response message, wherein the overlapping transmission units are used to represent overlapping transmission units of two random access response windows;

determine the receiving terminal of the random access response message according to the value of the reserved bit; and when determining that the receiving terminal is the first user equipment, send a Message3 based on message content of the random access response message.

According to a thirteenth aspect of the examples of the present disclosure, an apparatus for random access is provided, applied to a user equipment supporting New Radio access to unlicensed spectrum. The apparatus includes:

a processor;

a memory for storing processor executable instructions; wherein the processor is configured to:

after sending a random access preamble, monitor a random access response message in a random access response window, wherein a length of the random access response window exceeds a preset value;

when a receiving position where the random access response message is monitored belongs to overlapping transmission units, read the reserved bit in the random access response message, wherein the reserved bit is used to indicate a receiving terminal of the random access response message, and the overlapping transmission units are used to represent overlapping transmission units of two random access response windows;

determine the receiving terminal of the random access response message according to the value of the reserved bit; and when determining that the receiving terminal is the first user equipment, send a Message3 based on message content of the random access response message.

According to a fourteenth aspect of the examples of the present disclosure, an apparatus for random access is provided, applied to a base station supporting New Radio access to unlicensed spectrum. The apparatus includes:

a processor;

a memory for storing processor executable instructions; wherein the processor is configured to:

after receiving a random access preamble sent by a user equipment, determine a sending position for sending a random access response message, wherein the random access response message includes a reserved bit, and the reserved bit is used to indicate a receiving terminal of the random access response message;

when the sending position belongs to overlapping transmission units of the random access response window, set a value of the reserved bit in the random access response message to a value that can indicate the receiving terminal of the random access response message; and send a generated random access response message.

According to a fifteenth aspect of the examples of the present disclosure, an apparatus for random access is provided, applied to a base station supporting New Radio access to unlicensed spectrum. The apparatus includes:

a processor;

a memory for storing processor executable instructions; wherein the processor is configured to:

after receiving a random access preamble sent by a user equipment, setting a value of a reserved bit in the random access response message to a value indicating a receiving terminal of the random access response message; and sending a generated random access response message.

According to a sixteenth aspect of the examples of the present disclosure, a non-transitory computer-readable storage medium storing computer instructions thereon, wherein the computer program is used to perform the method for random access provided in the first aspect.

According to a seventeenth aspect of the examples of the present disclosure, a non-transitory computer-readable storage medium storing computer instructions thereon, wherein the computer program is used to perform the method for random access provided in the second aspect.

According to an eighteenth aspect of the examples of the present disclosure, a non-transitory computer-readable storage medium storing computer instructions thereon, wherein the computer program is used to perform the method for random access provided in the third aspect.

According to a nineteenth aspect of the examples of the present disclosure, a non-transitory computer-readable storage medium storing computer instructions thereon, wherein the computer program is used to perform the method for random access provided in the fourth aspect.

According to a twentieth aspect of the examples of the present disclosure, a non-transitory computer-readable storage medium storing computer instructions thereon, wherein the computer program is used to perform the method for random access provided in the fifth aspect.

The technical solutions provided by the embodiments of the present disclosure can include the following beneficial effects.

After the UE supporting NR-U sends a random access preamble for random access, if a random access response message is monitored in the random access response window, the UE can determine which user equipment is the receiving terminal of the random access response message based on the value of the reserved bit to obtain the receiving terminal. In the technical solution, when the length of the random access response window is larger than one radio frame and thus there are overlapping transmission units in the random access response window among different UEs, the UE that needs to receive RAR can still be uniquely identified in the overlapping transmission units, thereby improving the access success rate for the UE which supports NR-U performing random access when competition for unlicensed frequency band resources is fierce.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1A:
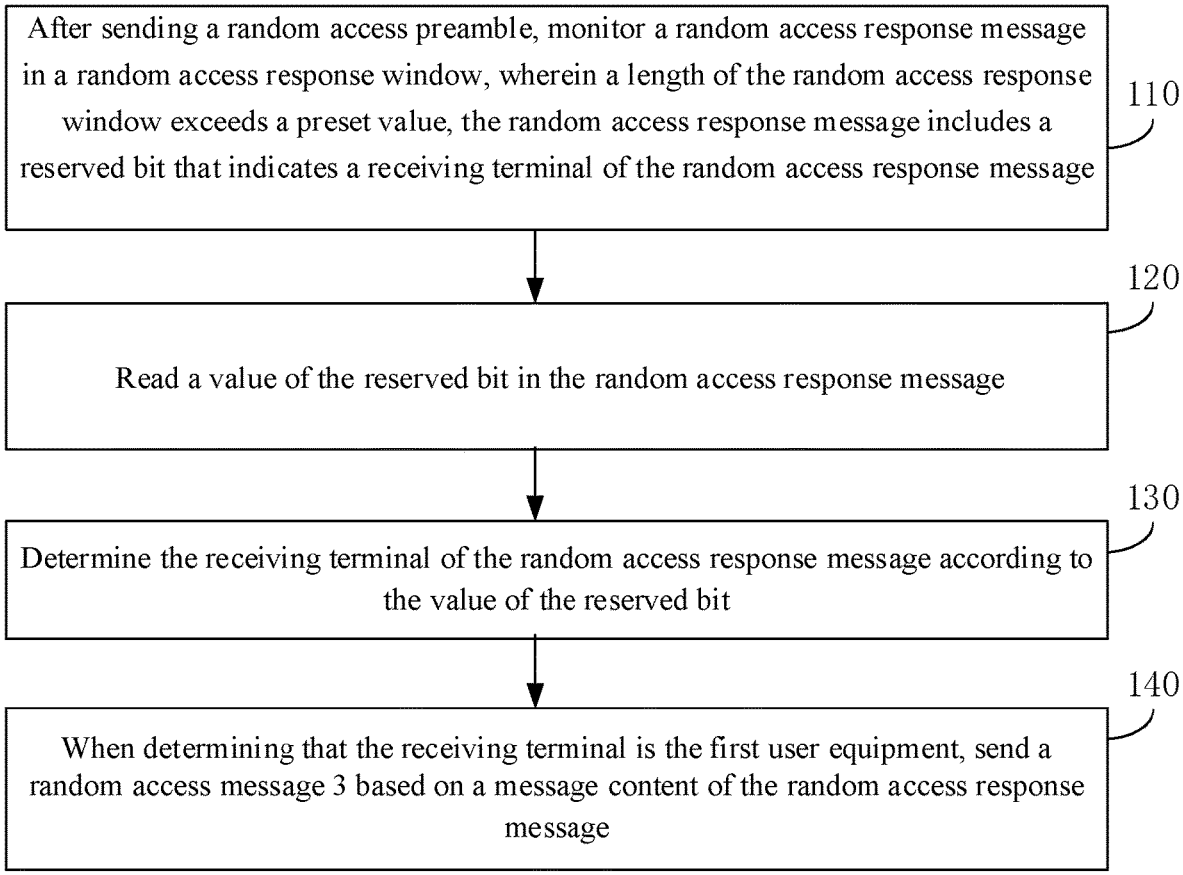
FIG. 1A is a flowchart illustrating a random access method according to an example.

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of devices and methods consistent with some aspects of the present disclosure as detailed in the appended claims.

The technical solution provided by the present disclosure is applicable to a NR-U communication system. In the NR-U communication system, when a UE accesses the network, the UE needs to perform LBT detection first, and a base station, upon receiving a random access preamble sent by the UE, needs to perform channel detection in a random access response window, ra-ResponseWindow, and send an RAR message after the channel detection is successful. In order to improve the success rate of sending the RAR message, a length of the ra-ResponseWindow in the NR-U communication system is longer than a length of a radio frame.

Figure 1B:
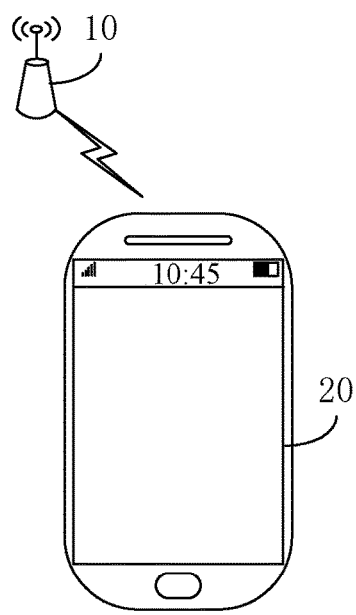
FIG. 1B is a scene diagram illustrating a random access method according to an example.
Figures 1C, 1D:
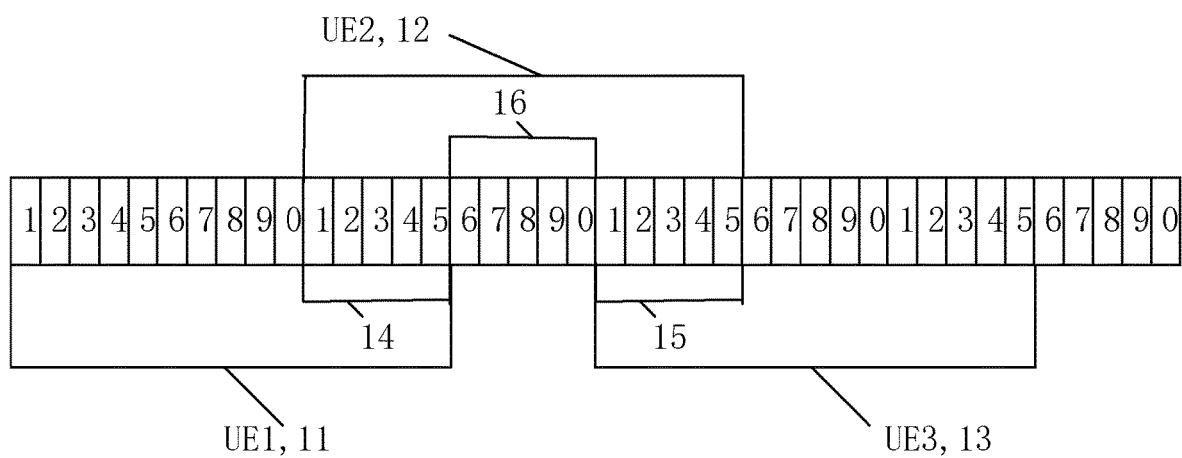
FIG. 1C is a schematic diagram illustrating a format of a MAC RAR message according to an example.
FIG. 1D is a schematic diagram illustrating a random access response window of a UE using two adjacent radio frames according to an example.

FIG. 1A is a flowchart illustrating a random access method according to an example, FIG. 1B is a scene diagram illustrating a random access method according to an example, FIG. 1C is a schematic diagram illustrating a format of a MAC (Media Access Control) RAR message according to an example, and FIG. 1D is a schematic diagram illustrating a random access response window of a UE using two adjacent radio frames according to an example. The random access method can be applied to a first user equipment supporting NR-U. As shown in FIG. 1A, the random access method includes the following steps 110-140.

At step 110, after a random access preamble is sent, a random access response message is monitored in a random access response window, where a length of the random access response window exceeds a preset value and the random access response message includes a reserved bit that indicates a receiving terminal of the random access response message.

In an example, the preset value can be the length of one radio frame, and the length of the radio frame is 10 ms. Therefore, the length of the random access response window in the present disclosure is longer than 10 ms, for example, the length of the random access response window can be 12 ms, 15 ms, and so on.

In an example, the random access response message includes a reserved bit, and the reserved bit is used to indicate the receiving terminal of the random access response message. When a base station sends the RAR at any position in the random access response window, the receiving terminal can be indicated by the reserved bit. Therefore, the RAR received by the user equipment at any receiving position uses the reserved bit to indicate the receiving terminal of the random access response message.

At step 120, a value of the reserved bit in the random access response message is read.

In an example, the value of the reserved bit can indicate whether the RAR is sent to a UE corresponding to a previous radio frame or to a UE corresponding to a current radio frame.

In an example, a communication protocol can make an agreement that the value of the reserved bit, when it is set to 1, may indicate that the RAR is sent to the UE corresponding to the previous radio frame, and when it is set to 0, may indicate the RAR is sent to the UE corresponding to the current radio frame. Under this agreement, referring to FIG. 1D, if an RAR is monitored in a transmission unit indicated by reference number 14 and the value of the reserved bit of the RAR is set to 1, it can indicate that the RAR is sent to UE 1, and if the value of the reserved bit of the RAR is set to 1, it can indicate that the RAR is sent to UE 2.

In an example, the communication protocol can also make an agreement that the value of the reserved bit, when it is set to 0, may indicate that the RAR is sent to the UE corresponding to the previous radio frame, and when it is set to 1, may indicate the RAR is sent to the UE corresponding to the current radio frame. Under this agreement, referring to FIG. 1D, if an RAR is monitored in the transmission unit indicated by reference number 14 and the value of the reserved bit of the RAR is set to 1, it can indicate that the RAR is sent to UE 2, and if the value of the reserved bit of the RAR is set to 0, it can indicate that the RAR is sent to UE 1.

At step 130, the receiving terminal of the random access response message is determined according to the value of the reserved bit.

In an example, the position where the RAR is received may or may not be overlapping transmission units. First Q transmission units and last Q transmission units of the random access response window are overlapping transmission units.

In an example, referring to FIG. 1D, when the length of the random access response window exceeds the length of one radio frame, the random access response windows of UEs using two adjacent radio frames may overlap. As shown in FIG. 1D, the random access response windows of UE 1, UE 2, and UE 3 are the time windows indicated by reference numbers 11, 12, and 13, respectively, and the lengths are all 15 ms. There are overlapping transmission units between the windows indicated by reference numbers 11 and 12, such as the 5 subframes indicated by reference number 14, and the windows indicated by numbers 12 and 13 also have overlapping transmission units, such as the 5 subframes indicated by reference number 15. That is, the first 5 subframes of the random access response window of UE 2 are overlapping transmission units with those of UE 1, and the last 5 subframes of the random access response window of UE 2 are overlapping transmission units with those of UE 3, with only the middle 5 subframes (the subframes indicated by reference number 16) of the random access response window of UE 2 are not overlapping transmission units.

In an example, if an overlapping transmission unit to which the receiving position belongs locates at the first Q transmission units of the random access response window and the value of the reserved bit indicates that the receiving terminal is the user equipment corresponding to the current radio frame, the receiving terminal of the random access response message is determined to be the first user equipment. As shown in FIG. 1D, UE 2 monitors an RAR in a transmission unit indicated by reference number 14, and the value of the reserved bit indicates that the receiving terminal is the user equipment associated with the current radio frame, then UE 2 can determine that the receiving terminal is UE 2 itself instead of UE 1 corresponding to the previous radio frame.

In an example, if the overlapping transmission unit to which the receiving position belongs locates at the first Q transmission units of the random access response window and the value of the reserved bit indicates that the receiving terminal is the user equipment corresponding to the previous radio frame, it is determined that the receiving terminal of the random access response message is not the first user equipment. As shown in FIG. 1D, UE 2 monitors an RAR in a transmission unit indicated by reference number 14, and the value of the reserved bit indicates that the receiving terminal is the user equipment associated with the previous radio frame, then UE 2 can determine that the receiving terminal is UE 1 instead of UE 2.

In an example, if the overlapping transmission unit to which the receiving position belongs is within the last Q transmission units of the random access response window and the value of the reserved bit indicates that the receiving terminal is the user equipment corresponding to the previous radio frame, the receiving terminal of the random access response message is determined to be the first user equipment. As shown in FIG. 1D, UE 2 monitors an RAR in a transmission unit indicated by reference number 15, and the value of the reserved bit indicates that the receiving terminal is the user equipment associated with the previous radio frame, then UE 2 can determine that the receiving terminal is UE 2 itself instead of UE 3.

In an example, if the overlapping transmission unit to which the receiving position belongs is within the last Q transmission units of the random access response window and the value of the reserved bit indicates that the receiving terminal is the user equipment corresponding to the current radio frame, it is determined that the receiving terminal of the random access response message is not the first user equipment. As shown in FIG. 1D, UE 2 monitors an RAR in a transmission unit indicated by reference number 15, and the value of the reserved bit indicates that the receiving terminal is the user equipment associated with the current radio frame, then UE 2 can determine that the receiving terminal is UE 3 instead of UE 2.

In an example, the value of Q is determined based on the length L of the random access response window, and the value of Q may be L−10. For example, if the length is 15 ms, the value of Q may be 5.

In an example, since in non-overlapping transmission units, only one user equipment may monitor the RAR, the base station can use the value of the reserved bit to indicate that the receiving terminal is the user equipment corresponding to the current radio frame, and when the value of the reserved bit indicates that the receiving terminal is the user equipment corresponding to the current radio frame, the first user equipment monitoring the RAR can determine that the receiving terminal of the random access response message is the first user equipment.

At step 140, if it is determined that the receiving terminal is the first user equipment, a random access message 3 is sent based on a message content of the random access response message.

In an example, if the receiving terminal is the first user equipment that sends the random access request message, the first user equipment can send random access message 3 (MSG3) based on the message content in the random access response message, such as the Timing Advance Command, Uplink (UL) Grant, Temporary cell radio network temporary identifier (Temporary C-RNTI) and so on.

In an example, the remaining random access procedure after the UE sends the MSG3 message can refer to the random access procedure in the related art, which is described here.

In an exemplary scenario, as shown in FIG. 1B, a mobile network is an NR-U network and a base station is gNB as an example for exemplary description. In the scenario shown in FIG. 1B, there are gNB 10 and UE 20, both supporting NR-U. When UE 20 sends a random access preamble for random access, gNB 10 needs to perform LBT detection during a random access response window, and after LBT detection succeeds, gNB 10 sends an RAR in the random access response window. Since the length of the random access response window in this disclosure exceeds the length of one radio frame, the random access response windows of UEs with adjacent frames have overlapping transmission units, so the gNB 10 can use the reserved bit of the RAR to indicate which user equipment the receiving terminal is. Thus, a UE that needs to receive the RAR can be uniquely identified in the overlapping transmission units.

In this example, through the above steps 110-140, after the UE supporting NR-U sends a random access preamble for random access, if a random access response message is monitored in the random access response window, the UE can read the value of the reserved bit to obtain the receiving terminal, so that a UE that needs to receive the RAR can be uniquely identified when the length of the random access response window is larger than the preset value, thereby improving the access success rate for the UE which supports NR-U performing random access when competition for unlicensed frequency band resources is fierce.

Figure 2:
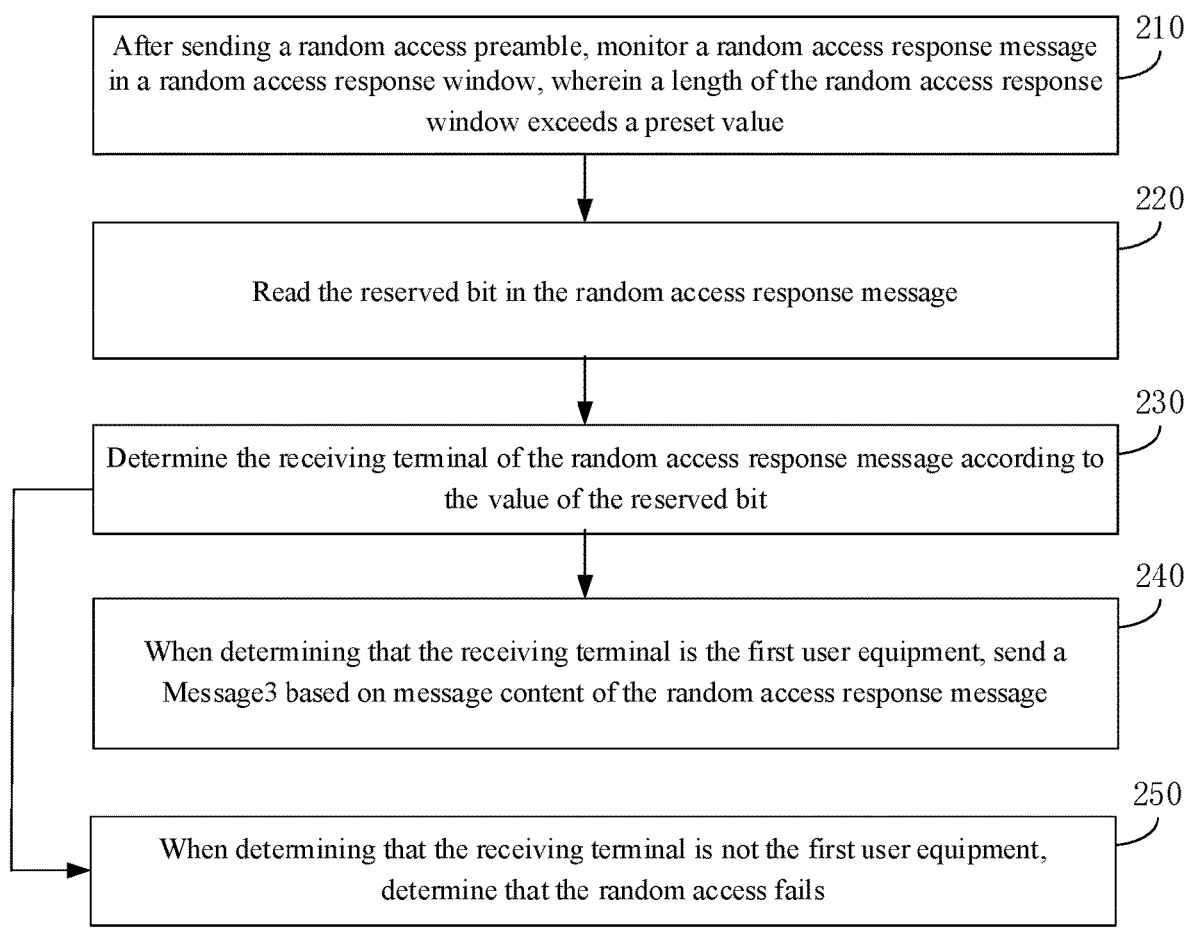
FIG. 2 is a flowchart illustrating another random access method according to an example.

FIG. 2 is a flowchart illustrating another random access method according to an example; the random access method can be applied to a first user equipment supporting NR-U. Based on the example shown in FIG. 1A, as shown in FIG. 2, the random access method includes the following steps 210-250.

At step 210, after a random access preamble is sent, a random access response message is monitored in a random access response window, a length of the random access response window exceeds a preset value.

At step 220, a value of the reserved bit in the random access response message is read.

At step 230, the receiving terminal of the random access response message is determined according to the value of the reserved bit.

At step 240, if it is determined that the receiving terminal is the first user equipment, a Message3 is sent based on message content of the random access response message.

In an example, the description of step 210 to step 240 can refer to the example shown in FIG. 1A, which will not be elaborated herein.

At step 250, if it is determined that the receiving terminal is not the first user equipment, it is determined that the random access fails.

In an example, if the first user equipment does not monitor the RAR sent by the base station in response to the random access preamble sent by the first user equipment in the random access response window, the first user equipment can be determined that the random access has failed, and perform processing for not receiving the RAR, for example, adding a count value of a preamble transmission counter PREAMBLE_TRANSMISSION_COUNTER by one, selecting a random access resource position to initiate a random access process again, and so on.

In this example, after the UE supporting NR-U sends a random access preamble for random access, if a random access response message is monitored in the random access response window, the value of the reserved bit can be read to obtain the receiving terminal, so that when the length of the random access response window is larger than the preset value, the UE that needs to receive RAR can still be uniquely identified, thereby improving the access success rate for the UE which supports NR-U performing random access when competition for unlicensed frequency band resources is fierce. In addition, when a user equipment determines that the RAR monitored in the random access response window does not belong to the user equipment itself, the user equipment can determine that this random access has failed, and select a random access resource position to initiate the random access process again.

Figure 3:
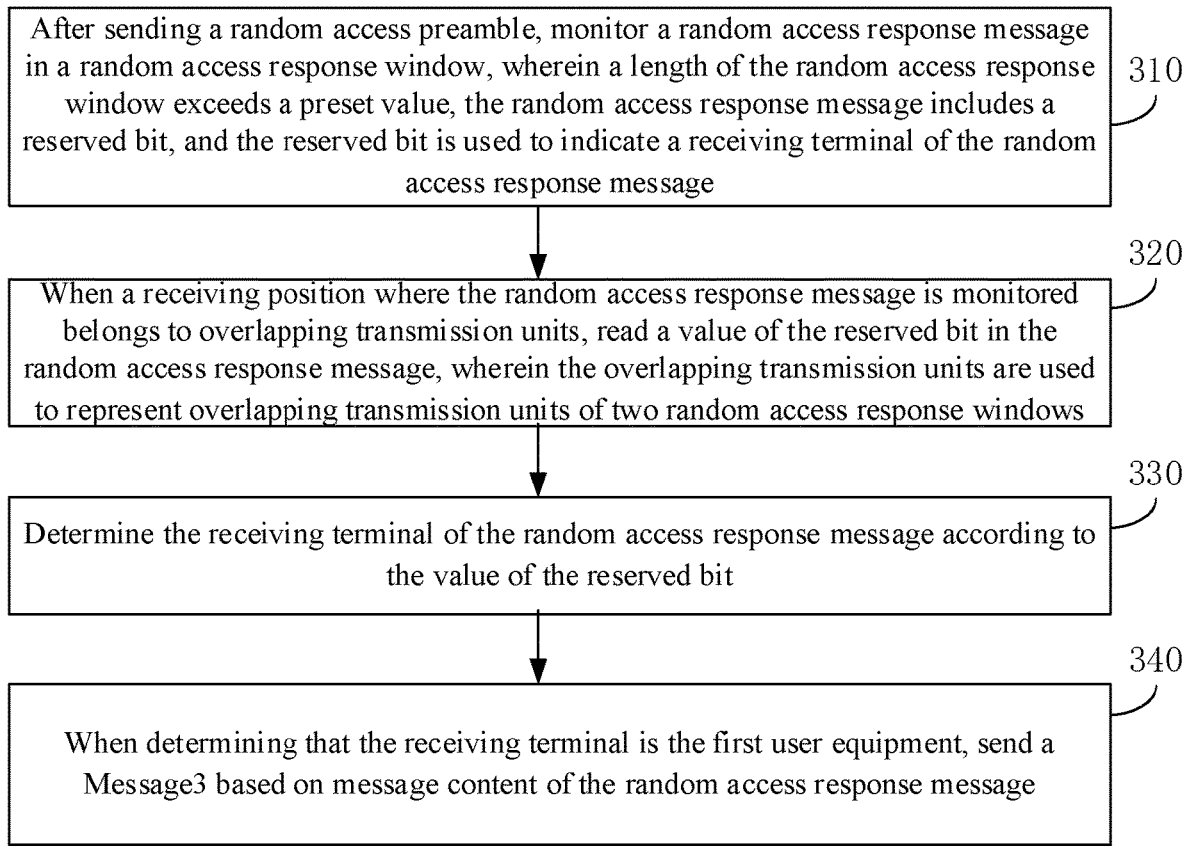
FIG. 3 is a flowchart illustrating a random access method according to an example.

FIG. 3 is a flowchart illustrating a random access method according to an example; the random access method can be applied to a first user equipment supporting NR-U, as shown in FIG. 3, the random access method includes the following steps 310-340:

At step 310, after a random access preamble is sent, a random access response message is monitored in a random access response window, a length of the random access response window exceeds a preset value, and the random access response message includes a reserved bit that indicates a receiving terminal of the random access response message.

In an example, the preset value can be the length of one radio frame, and the length of the radio frame is 10 ms. Therefore, the length of the random access response window in the present disclosure is longer than 10 ms, for example, the length of the random access response window can be 12 ms, 15 ms, and so on.

In an example, the random access response message includes a reserved bit, and the reserved bit is used to indicate the receiving terminal of the random access response message. When the base station sends the RAR at any position in the random access response window, the receiving terminal can be indicated by a reserved bit. Therefore, the RAR received by the user equipment at any receiving position uses a value of the reserved bit to indicate the receiving terminal.

At step 320, if the receiving position where the random access response message is monitored belongs to overlapping transmission units, a value of the reserved bit in the random access response message is read, where the overlapping transmission units are used to represent transmission units overlapping between two random access response windows.

In an example, no matter at which position of the random access response window the base station sends the RAR, the base station can indicate the receiving terminal with the reserved bit anyway, so that the user equipment can obtain the receiving terminal through the value of the reserved bit in the RAR received at any receiving position. Nevertheless, when the user equipment monitors the RAR at a position that does not belong to the overlapping transmission units, the user equipment can directly determine that the receiving terminal is the user equipment itself. In this case, the user equipment needs not to read the value of the reserved bit. When the user equipment monitors the RAR in the overlapping transmission units, the user equipment has to read the value of the reserved bit.

In an example, the value of the reserved bit can indicate whether the RAR is sent to the UE corresponding to a previous radio frame or to the UE of the current radio frame.

In an example, a communication protocol can make an agreement that when the value of the reserved bit is set to 1, it can indicate that the RAR is sent to the UE corresponding to the previous radio frame, and when the value of the reserved bit is set to 0, it can indicate the RAR is sent to the UE of the current radio frame. Under this agreement, referring to FIG. 1D, if an RAR is monitored in the transmission unit indicated by the reference number 14, and the value of the reserved bit of the RAR is set to 1, it can indicate that the RAR is sent to UE 1, and if the value of the reserved bit of the RAR is set to 1, it can indicate that the RAR is sent to UE 2.

In an example, the communication protocol can also make an agreement that when the value of the reserved bit is set to 0, it can indicate that the RAR is sent to the UE corresponding to the previous radio frame, and when the value of the reserved bit is set to 1, it can indicate the RAR is sent to the UE of the current radio frame. Under this agreement, referring to FIG. 1D, if an RAR is monitored in the transmission unit indicated by the reference number 14, and the value of the reserved bit of the RAR is set to 1, it can indicate that the RAR is sent to UE 2, and if the value of the reserved bit of the RAR is set to 0, it can indicate that the RAR is sent to UE 1.

At step 330, the receiving terminal of the random access response message is determined according to the value of the reserved bit.

In an example, referring to FIG. 1D, when the length of the random access response window exceeds the length of one radio frame, the random access response windows of UEs of two adjacent radio frames may overlap. As shown in FIG. 1D, the random access response windows of UE 1, UE 2, and UE 3 are the time windows indicated by reference numbers 11, 12, and 13, respectively, and the lengths are all 15 ms. There are overlapping transmission units between the windows indicated by reference numbers 11 and 12, such as the 5 subframes indicated by reference number 14, and the windows indicated by numbers 12 and 13 also have overlapping transmission units, such as the 5 subframes indicated by reference number 15. That is, the first 5 subframes of the random access response window of UE 2 are overlapping transmission units with those of UE 1, and the last 5 subframes of the random access response window of UE 2 are overlapping transmission units with those of UE 3, with only the middle 5 subframes (the subframes indicated by reference number 16) are not overlapping transmission units.

In an example, if the overlapping transmission units to which the receiving position belongs locates at the first Q transmission units of the random access response window and the value of the reserved bit indicates that the receiving terminal is the user equipment of the current radio frame, then the receiving terminal of the random access response message is determined to be the first user equipment.

In an example, if the overlapping transmission unit to which the receiving position belongs locates at the first Q transmission units of the random access response window, and the value of the reserved bit indicates that the receiving terminal is the user equipment of the previous radio frame, then it is determined that the receiving terminal of the random access response message is not the first user equipment.

In an example, if the overlapping transmission unit to which the receiving position belongs locates at the last Q transmission units of the random access response window, and the value of the reserved bit indicates that the receiving terminal is the user equipment of the previous radio frame, then the receiving terminal of the random access response message is determined to be the first user equipment.

In an example, if the overlapping transmission unit to which the receiving position belongs locates at the last Q transmission units of the random access response window, and the value of the reserved bit indicates that the receiving terminal is the user equipment of the current radio frame, then it is determined that the receiving terminal of the random access response message is not the first user equipment.

At step 340, if it is determined that the receiving terminal is the first user equipment, a Message3 is sent based on message content of the random access response message.

In this example, after the UE supporting NR-U sends a random access preamble for random access, if a random access response message is monitored in overlapping transmission units of the random access response window, since the base station uses the reserved bit of the random access response message to indicate the receiving terminal, the UE can read the value of the reserved bit to obtain the receiving terminal, so that the UE that needs to receive the RAR can still be uniquely identified when the length of the random access response window is larger than the preset value, thereby improving the access success rate for the UE which supports NR-U performing random access when competition for unlicensed frequency band resources is fierce.

Figure 4:
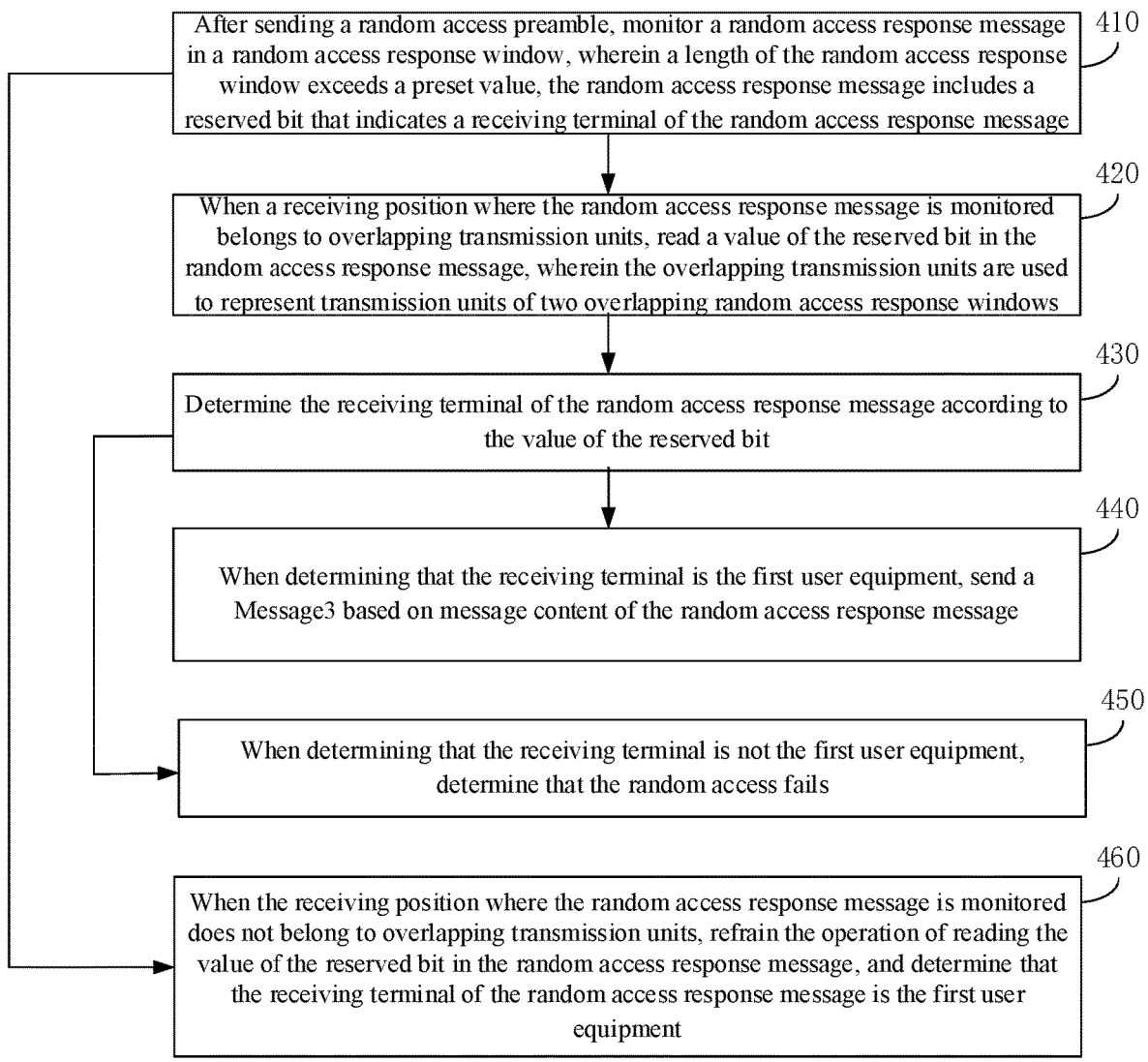
FIG. 4 is a flowchart illustrating another random access method according to an example.

FIG. 4 is a flowchart illustrating another random access method according to an example; the random access method can be applied to a first user equipment supporting NR-U. Based on the example shown in FIG. 3, as shown in FIG. 4, the random access method includes the following steps 410-460.

At step 410, after a random access preamble is sent, a random access response message is monitored in a random access response window, a length of the random access response window exceeds a preset value, the random access response message includes a reserved bit that indicates a receiving terminal of the random access response message, and step 420 or step 460 is performed.

At step 420, if the receiving position where the random access response message is monitored belongs to overlapping transmission units, a value of the reserved bit in the random access response message is read, where the overlapping transmission units are used to represent transmission units overlapped between two random access response windows.

At step 430, the receiving terminal of the random access response message is determined according to the value of the reserved bit.

At step 440, if it is determined that the receiving terminal is the first user equipment, a Message3 is sent based on message content of the random access response message.

At step 450, if it is determined that the receiving terminal is not the first user equipment, it is determined that the random access fails.

In an example, if the first user equipment does not monitor the RAR sent by the base station in response to the random access preamble sent by the first user equipment in the random access response window, the first user equipment can be determined that the random access has failed, and perform processing for not receiving the RAR, for example, adding a count value of a preamble transmission counter PREAMBLE_TRANSMISSION_COUNTER by one, selecting a random access resource position to initiate a random access process again, and so on.

At step 460, if the receiving position where the random access response message is monitored does not belong to overlapping transmission units, the operation of reading the value of the reserved bit in the random access response message is refrained, and it is determined that the receiving terminal of the random access response message is the first user equipment.

In an example, although the base station uses RAR in the random access response message to indicate the receiving terminal, since the receiving position is a non-overlapping transmission unit, the user equipment can directly determine that the receiving terminal is the user equipment itself, so there is no need to read the value of the reserved bit.

In this example, after the user equipment supporting NR-U sends the random access preamble for random access, if the random access response message is monitored in the first Q overlapping transmission units of the random access response window, the value of the reserved bit indicates that when the receiving terminal is the user equipment of the current frame, the RAR can be determined to be the RAR sent to the user equipment itself; and if the random access response message is monitored in the last Q overlapping transmission units of the random access response window, the value of the reserved bit indicates that when the receiving terminal is the user equipment of the previous frame, the RAR can be determined to be the RAR sent to the user equipment itself. In addition, when the receiving position is a non-overlapping transmission unit, the receiving terminal can be directly determined without reading the value of the reserved bit, thereby reducing the power consumption of the UE.

Figure 5:
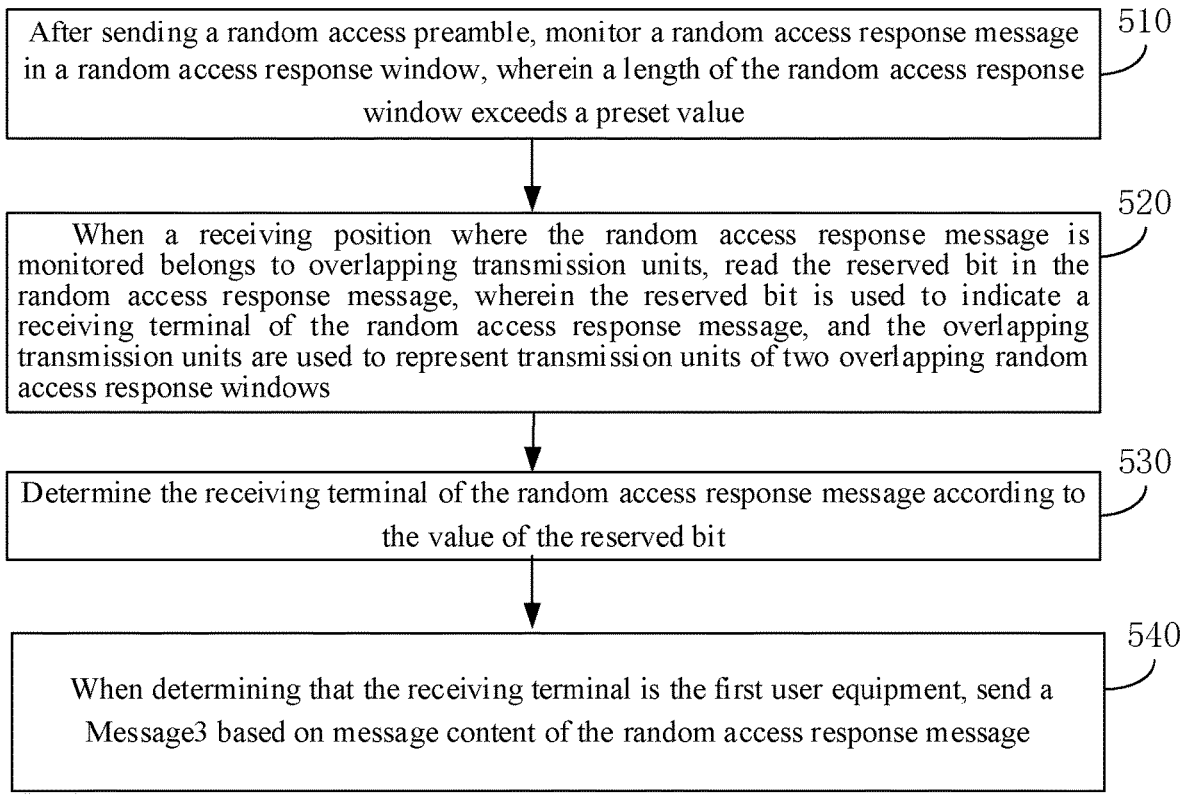
FIG. 5 is a flowchart illustrating a random access method according to an example.

FIG. 5 is a flowchart illustrating a random access method according to an example; the random access method can be applied to a first user equipment supporting NR-U. As shown in FIG. 5, the random access method includes the following steps 510-540.

At step 510, after a random access preamble is sent, a random access response message is monitored in a random access response window, a length of the random access response window exceeds a preset value.

In an example, the preset value can be the length of one radio frame, and the length of the radio frame is 10 ms. Therefore, the length of the random access response window in the present disclosure is longer than 10 ms, for example, the length of the random access response window can be 12 ms, 15 ms, and so on.

In an example, the random access response message includes a reserved bit, and the reserved bit is used to indicate the receiving terminal of the random access response message. Since the receiving terminal can be clearly determined when the RAR is transmitted in the non-overlapping transmission units, in this example, the base station does not use reserved bit to indicate the receiving terminal when sending the RAR in the non-overlapping transmission units of the random access response window. Therefore, the user equipment cannot read the value of the reserved bit when the RAR is received in the non-overlapping transmission units, but the user equipment can be directly determined that the receiving terminal is the user equipment itself according to the receiving position as a non-overlapping transmission unit.

At step 520, if the receiving position where the random access response message is monitored belongs to overlapping transmission units, the reserved bit in the random access response message is read, where the reserved bit is used to indicate a receiving terminal of the random access response message, and the overlapping transmission units are used to represent transmission units overlapped between two random access response windows.

At step 530, the receiving terminal of the random access response message is determined according to a value of the reserved bit.

In an example, if the receiving position is the first Q transmission units of the random access response window, and the value of the reserved bit indicates that the receiving terminal is the user equipment of the current radio frame, then the receiving terminal of the random access response message is determined as the first user equipment.

In an example, if the receiving position is the first Q transmission units of the random access response window, and the value of the reserved bit indicates that the receiving terminal is the user equipment of the previous radio frame, it is determined that the receiving terminal of the random access response message is not the first user equipment.

In an example, if the receiving position is the last Q transmission units of the random access response window, and the value of the reserved bit indicates that the receiving terminal is the user equipment of the previous radio frame, then the receiving terminal of the random access response message is determined as the first user equipment.

In an example, if the receiving position is the last Q transmission units of the random access response window, and the value of the reserved bit indicates that the receiving terminal is the user equipment of the current radio frame, then it is determined that the receiving terminal of the random access response message is not the first user equipment.

Here, both of the first Q transmission units and the last Q transmission units belong to overlapping transmission units.

In an example, referring to FIG. 1D, when the length of the random access response window exceeds the length of one radio frame, the random access response windows of UEs of two adjacent radio frames may overlap. As shown in FIG. 1D, the random access response windows of UE 1, UE 2, and UE 3 are the time windows indicated by reference numbers 11, 12, and 13, respectively, and the lengths are all 15 ms. There are overlapping transmission units between the windows indicated by reference numbers 11 and 12, such as the 5 subframes indicated by reference number 14, and the windows indicated by numbers 12 and 13 also have overlapping transmission units, such as the 5 subframes indicated by reference number 15. That is, the first 5 subframes of the random access response window of UE 2 are overlapping transmission units with those of UE 1, and the last 5 subframes of the random access response window of UE 2 are overlapping transmission units with those of UE 3, with only the middle 5 subframes (the subframes indicated by reference number 16) are not overlapping transmission units.

At step 540, if it is determined that the receiving terminal is the first user equipment, a Message3 is sent based on message content of the random access response message.

In this example, after the UE supporting NR-U sends a random access preamble for random access, if a random access response message is monitored in overlapping transmission units of the random access response window, since the base station uses the reserved bit of the random access response message to indicate the receiving terminal, the UE can read the value of the reserved bit to obtain the receiving terminal, so that the UE that needs to receive the RAR can still be uniquely identified when the length of the random access response window is larger than the preset value, thereby improving the access success rate for the UE which supports NR-U performing random access when competition for unlicensed frequency band resources is fierce.

Figure 6:
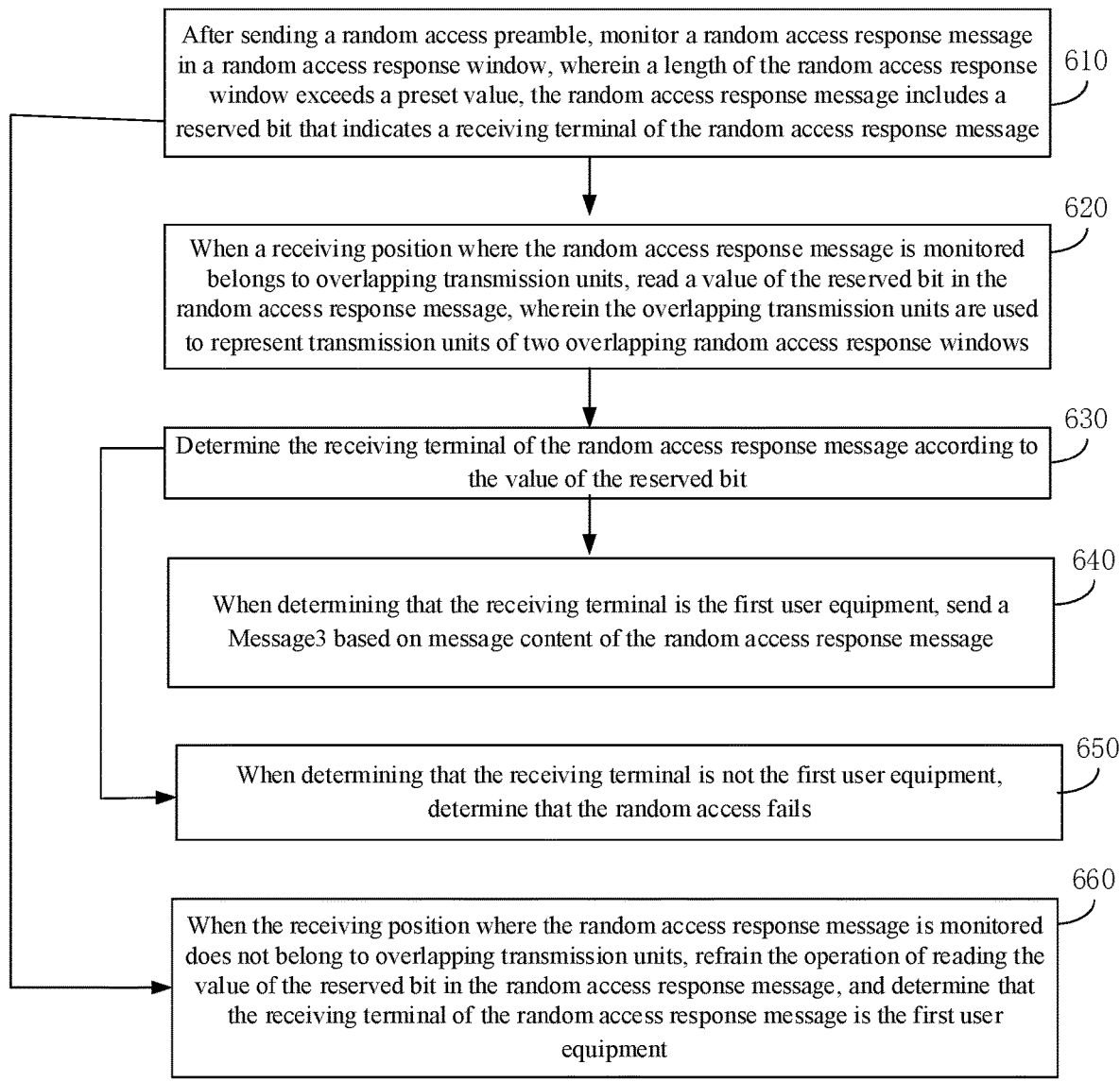
FIG. 6 is a flowchart illustrating another random access method according to an example.

FIG. 6 is a flowchart illustrating another random access method according to an example; the random access method can be applied to a first user equipment supporting NR-U. Based on the example shown in FIG. 5, as shown in FIG. 6, the random access method includes the following steps 610-660.

At step 610, after a random access preamble is sent, a random access response message is monitored in a random access response window, a length of the random access response window exceeds a preset value, the random access response message includes a reserved bit that indicates a receiving terminal of the random access response message, and step 620 or step 660 is performed.

At step 620, if the receiving position where the random access response message is monitored belongs to overlapping transmission units, a value of the reserved bit in the random access response message is read, where the overlapping transmission units are used to represent transmission units overlapped between two random access response windows.

At step 630, the receiving terminal of the random access response message is determined according to the value of the reserved bit, and step 640 or step 650 is performed.

At step 640, if it is determined that the receiving terminal is the first user equipment, a Message3 is sent based on message content of the random access response message.

In an embodiment, the description of step 610 to step 640 can refer to the description of step 510 to step 540 in the example shown in FIG. 5, which will not be described in detail herein.

At step 650, if it is determined that the receiving terminal is not the first user equipment, it is determined that the random access fails.

In an example, if the first user equipment does not monitor the RAR sent by the base station in response to the random access preamble sent by the first user equipment in the random access response window, the first user equipment can be determined that the random access has failed, and perform processing for not receiving the RAR, for example, adding a count value of a preamble transmission counter PREAMBLE_TRANSMISSION_COUNTER by one, selecting a random access resource position to initiate a random access process again, and so on.

At step 660, if the receiving position where the random access response message is monitored does not belong to overlapping transmission units, the operation of reading the value of the reserved bit in the random access response message is refrained, and the receiving terminal is determined as the first user equipment.

In an example, since in this example, in the random access response message monitored in the non-overlapping transmission unit of the random access response window, the base station does not use the reserved bit of the RAR to indicate the receiving terminal, so when the receiving position does not belong to the overlapping transmission unit, the user equipment does not perform the operation of reading the value of the reserved bit in the random access response message, and it is determined that the receiving terminal of the random access response message is the first user equipment.

In this example, after the UE supporting NR-U sends a random access preamble for random access, if a random access response message is monitored in overlapping transmission units of the random access response window, since the base station uses the reserved bit of the random access response message to indicate the receiving terminal, the UE can read the value of the reserved bit to obtain the receiving terminal, so that the UE that needs to receive the RAR can still be uniquely identified when the length of the random access response window is larger than the preset value. However, when the random access response message is monitored in the non-overlapping transmission units of the random access response window, since the base station side does not use the reserved bit of the random access response message to indicate the receiving terminal, the user equip-ment directly determines the receiving terminal without perform the operation of reading the value of the reserved bit in the random access response message, thereby reducing the power consumption of the user equipment.

It should be noted that in the examples of FIGS. 1A-4, in the RAR received by the user equipment in any window of the random access response message, a reserved bit is used to indicate the receiving terminal; while in the examples of FIGS. 5-6, in the RAR received by the user equipment in the overlapping transmission unit of the random access response message, the reserved bit is used to indicate the receiving terminal, and in the RAR received in the non-overlapping transmission unit of the random access response message, the reserved bit is not used to indicate the receiving terminal.

Figure 7:
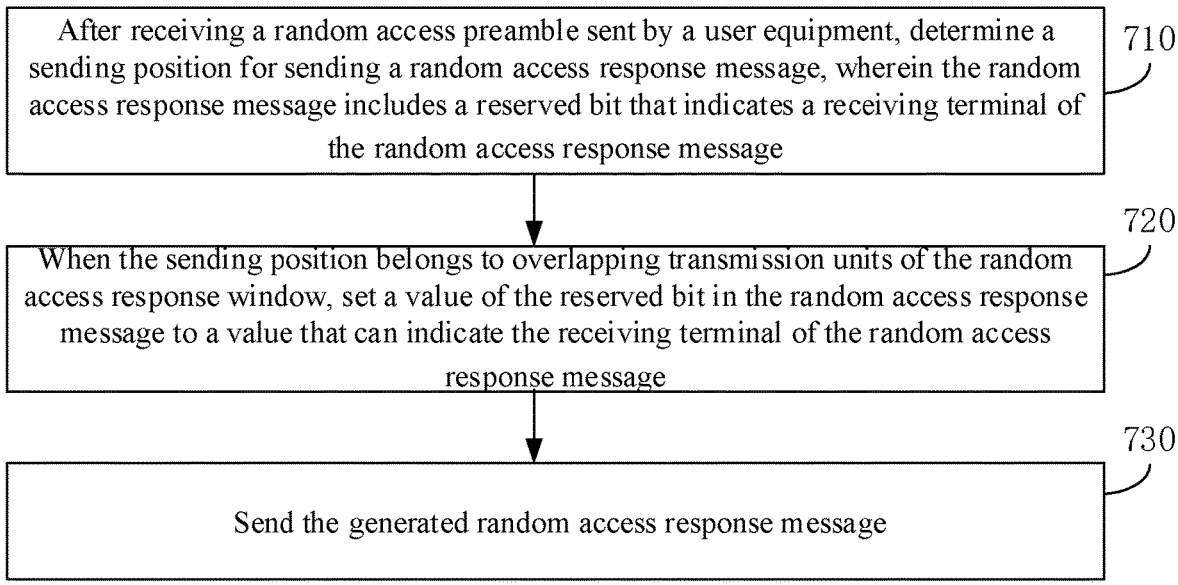
FIG. 7 is a flowchart illustrating a random access method according to an example.

FIG. 7 is a flowchart of a random access method according to an example; the random access method can be applied to a base station that supports New Radio access to unlicensed spectrum. The example will be described with reference to FIG. 1B, and as shown in FIG. 7, the random access method includes the following steps 710-730.

At step 710, after a random access preamble sent by a user equipment is received, a sending position for sending a random access response message is determined; the random access response message includes a reserved bit that indicates a receiving terminal of the random access response message.

In an example, a channel to be detected is a channel used to send a random access response message, and the base station can obtain a LBT detection result by detecting signal energy of the channel. For the implementation of LBT detection on the channel, reference can be made to relevant technical solutions about the LBT detection, which will not be described herein.

At step 720, if the sending position belongs to overlapping transmission units of the random access response window, a value of the reserved bit in the random access response message is set to a value that can indicate the receiving terminal of the random access response message.

In an example, the overlapping transmission units are used to represent transmission units overlapped between two random access response windows.

In an example, referring to FIG. 1D, when the length of the random access response window exceeds the length of one radio frame, the random access response windows of UEs of two adjacent radio frames may overlap. As shown in FIG. 1D, the random access response windows of UE 1, UE 2, and UE 3 are the time windows indicated by reference numbers 11, 12, and 13, respectively, and the lengths are all 15 ms. There are overlapping transmission units between the windows indicated by reference numbers 11 and 12, such as the 5 subframes indicated by reference number 14, and the windows indicated by numbers 12 and 13 also have overlapping transmission units, such as the 5 subframes indicated by reference number 15. That is, the first 5 subframes of the random access response window of UE 2 are overlapping transmission units with those of UE 1, and the last 5 subframes of the random access response window of UE 2 are overlapping transmission units with those of UE 3, with only the middle 5 subframes (the subframes indicated by reference number 16) are not overlapping transmission units.

In an example, a communication protocol can make an agreement that when the value of the reserved bit is set to 1, it can indicate that the RAR is sent to the UE corresponding to the previous radio frame, and when the value of the reserved bit is set to 0, it can indicate the RAR is sent to the UE of the current radio frame. In an example, the communication protocol can also make an agreement that when the value of the reserved bit is set to 0, it can indicate that the RAR is sent to the UE corresponding to the previous radio frame, and when the value of the reserved bit is set to 1, it can indicate the RAR is sent to the UE of the current radio frame.

In an example, if the overlapping transmission unit to which the receiving position belongs locates at the first Q transmission units of the random access response window, the base station can set the value of the reserved bit to a value indicating that the receiving terminal is the user equipment of the current radio frame. In an example, if the overlapping transmission unit to which the receiving position belong locates at the last Q transmission units of the random access response window, the base station can set the value of the reserved bit to a value indicating that the receiving terminal is the user equipment of the previous radio frame.

In an example, the value of Q is determined based on the length L of the random access response window, and the value of Q is L−10. For example, if the length is 15 ms, the value of Q is 5.

At step 730, a generated random access response message is sent.

In an exemplary scenario, as shown in FIG. 1B, the mobile network is an NR-U network and the base station is gNB as an example for exemplary description. In the scenario shown in FIG. 1B, there are gNB 10 and UE 20, both supporting NR-U. When UE 20 sends a random access preamble for random access, gNB 10 needs to perform LBT detection in a random access response window, and after LBT detection succeeds, gNB 10 sends an RAR in the random access response window. Since the length of the random access response window in this disclosure exceeds the length of one radio frame, the random access response windows of UEs in adjacent frames have overlapping transmission units, so the gNB 10 can use the preserve bit of the RAR to indicate which user equipment the receiving terminal is, so that the UE that needs to receive the RAR can be uniquely identified in the overlapping transmission units.

In this example, the base station uses the reserved bit to indicate the receiving terminal when determining that the sending position is an overlapping transmission unit, so as to realize that the UE that needs to receive RAR can be uniquely identified in the overlapping transmission unit.

Figure 8:
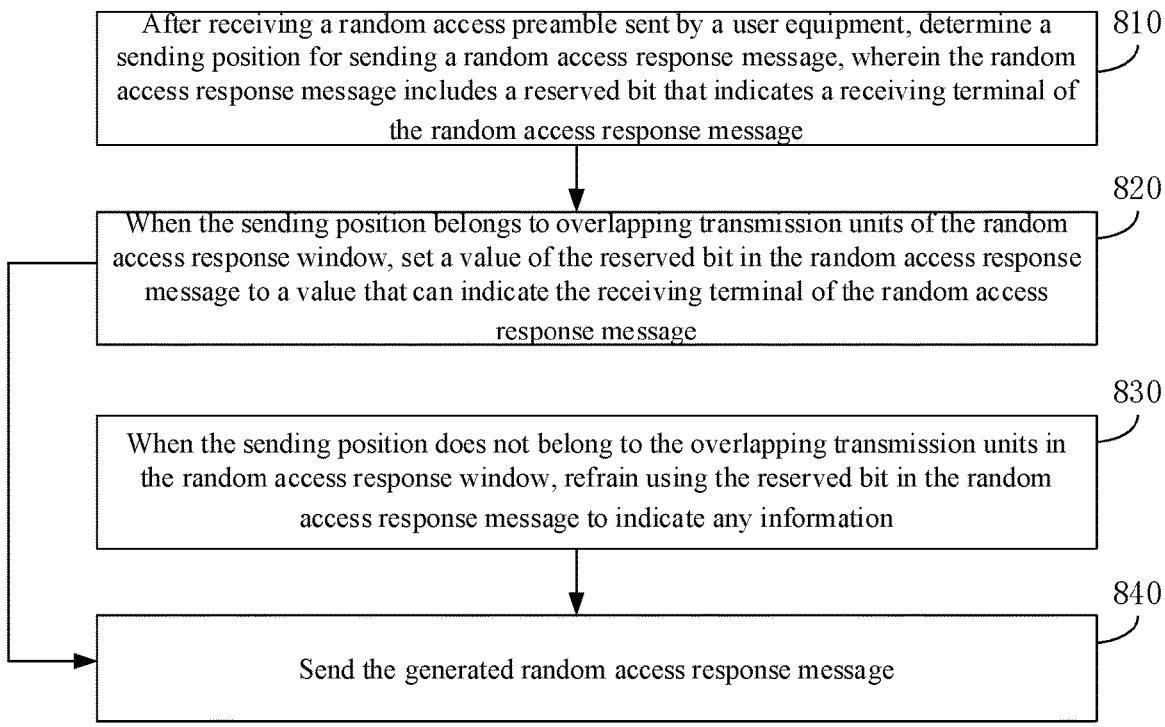
FIG. 8 is a flowchart illustrating another random access method according to an example.

FIG. 8 is a flowchart of a random access method according to an example; the random access method can be applied to a base station that supports New Radio access to unlicensed spectrum. Based on the example as shown in FIG. 7, the random access method includes the following steps 810-840.

At step 810, after a random access preamble sent by a user equipment is received, a sending position for sending a random access response message is determined; the random access response message includes a reserved bit, and the reserved bit is used to indicate a receiving terminal of the random access response message, and step 820 or step 830 is performed.

At step 820, if the sending position belongs to overlapping transmission units of the random access response window, a value of the reserved bit in the random access response message is set to a value that can indicate the receiving terminal of the random access response message.

At step 830, if the sending position does not belong to the overlapping transmission units of the random access response window, the base station refuses to use the reserved bit in the random access response message to indicate any information.

At step 840, a generated random access response message is sent.

In this example, when the base station determines that the sending position is an overlapping transmission unit, the base station uses the reserved bit to indicate the receiving terminal, so that the UE that needs to receive the RAR can be uniquely identified in the overlap transmission unit; when determining the sending position is not an overlap transmission, the base station refuses to use the reserved bit to indicate the receiving terminal, thereby reducing the workload of the base station.

It should be noted that in the examples shown in FIGS. 5-6, the RAR received by the user equipment can correspond to the RAR sent by the base station in the example shown in FIGS. 7-8.

Figure 9:
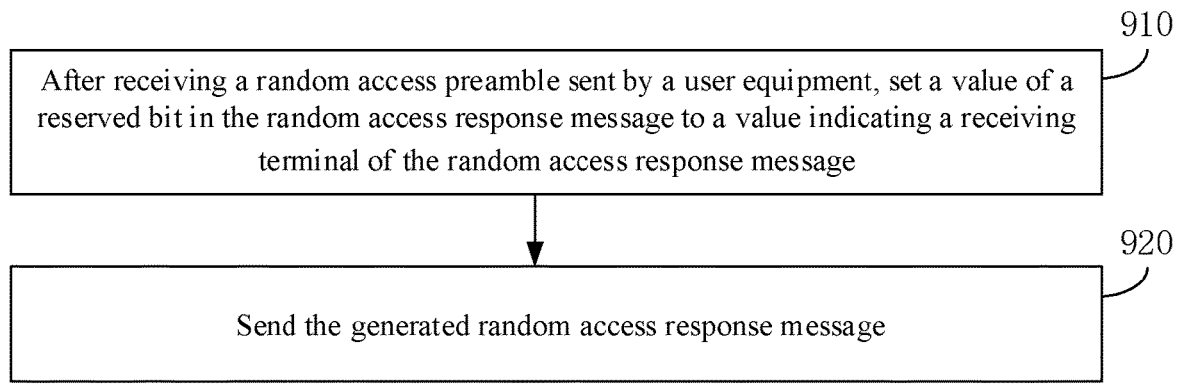
FIG. 9 is a flowchart illustrating a random access method according to an example.

FIG. 9 is a flowchart of a random access method according to an example; the random access method can be applied to a base station that supports New Radio access to unlicensed spectrum. The example will be described with reference to FIG. 1B, and as shown in FIG. 9, the random access method includes the following steps 910-920.

At step 910, after a random access preamble sent by a user equipment is received, a value of a reserved bit in the random access response message is set to a value indicating a receiving terminal of the random access response message.

In an example, a channel to be detected is a channel used to send a random access response message, and the base station can obtain a LBT detection result by detecting signal energy of the channel. For the implementation of LBT detection on the channel, reference can be made to relevant technical solutions about the LBT detection, which will not be described herein.

In an example, if the overlapping transmission unit to which the receiving position belongs locates at the first Q transmission units of the random access response window, the value of the reserved bit is set to a value indicating that the receiving terminal is the user equipment of the current radio frame.

In an example, if the overlapping transmission unit to which the receiving position belongs locates at the last Q transmission units of the random access response window, the value of the reserved bit is set to a value indicating that the receiving terminal is the user equipment of the previous radio frame.

In an example, if the sending position does not belong to the overlapping transmission units in the random access response window, the value of the reserved bit in the random access response message is set to a value indicating that the receiving terminal of random access response message is the user equipment of the current radio frame.

In an example, a communication protocol can make an agreement that when the value of the reserved bit is set to 1, it can indicate that the RAR is sent to the UE of the previous radio frame, and when the value of the reserved bit is set to 0, it can indicate the RAR is sent to the UE of the current radio frame. In an example, the communication protocol can also make an agreement that when the value of the reserved bit is set to 0, it can indicate that the RAR is sent to the UE of the previous radio frame, and when the value of the reserved bit is set to 1, it can indicate the RAR is sent to the UE of the current radio frame.

In an example, if the overlapping transmission unit to which the receiving position belong locates at the first Q transmission units of the random access response window, the base station can set the value of the reserved bit to a value indicating that the receiving terminal is the user equipment of the current radio frame. In an example, if the overlapping transmission unit to which the receiving position belong locates at the last Q transmission units of the random access response window, the base station can set the value of the reserved bit to a value indicating that the receiving terminal is the user equipment of the previous radio frame.

In an example, the value of Q is determined based on the length L of the random access response window, and the value of Q is L−10. For example, if the length is 15 ms, the value of Q is 5.

At step 920, a generated random access response message is sent.

In an exemplary scenario, as shown in FIG. 1B, the mobile network is an NR-U network and the base station is gNB as an example for exemplary description. In the scenario shown in FIG. 1B, there are gNB 10 and UE 20, both supporting NR-U. When UE 20 sends a random access preamble for random access, gNB 10 needs to perform LBT detection in a random access response window, and after LBT detection succeeds, gNB 10 sends an RAR in the random access response window. Since the length of the random access response window in this disclosure exceeds the length of one radio frame, the random access response windows of UEs in adjacent frames have overlapping transmission units, so the gNB 10 can use the preserve bit of the RAR to indicate which user equipment the receiving terminal is, so that the UE that needs to receive the RAR can be uniquely identified in the overlapping transmission units.

In this example, through the above steps 910-920, the base station can perform LBT detection in the random access response window after receiving the random access preamble, and when the LBT detection result is successful, set the value of the reserved bit to indicate the receiving terminal of the random access response message to the user equipment.

It should be noted that, in the examples of FIGS. 1A-4, the RAR received by the user equipment can correspond to the RAR sent by the base station in the example shown in FIG. 9.

Figure 10:
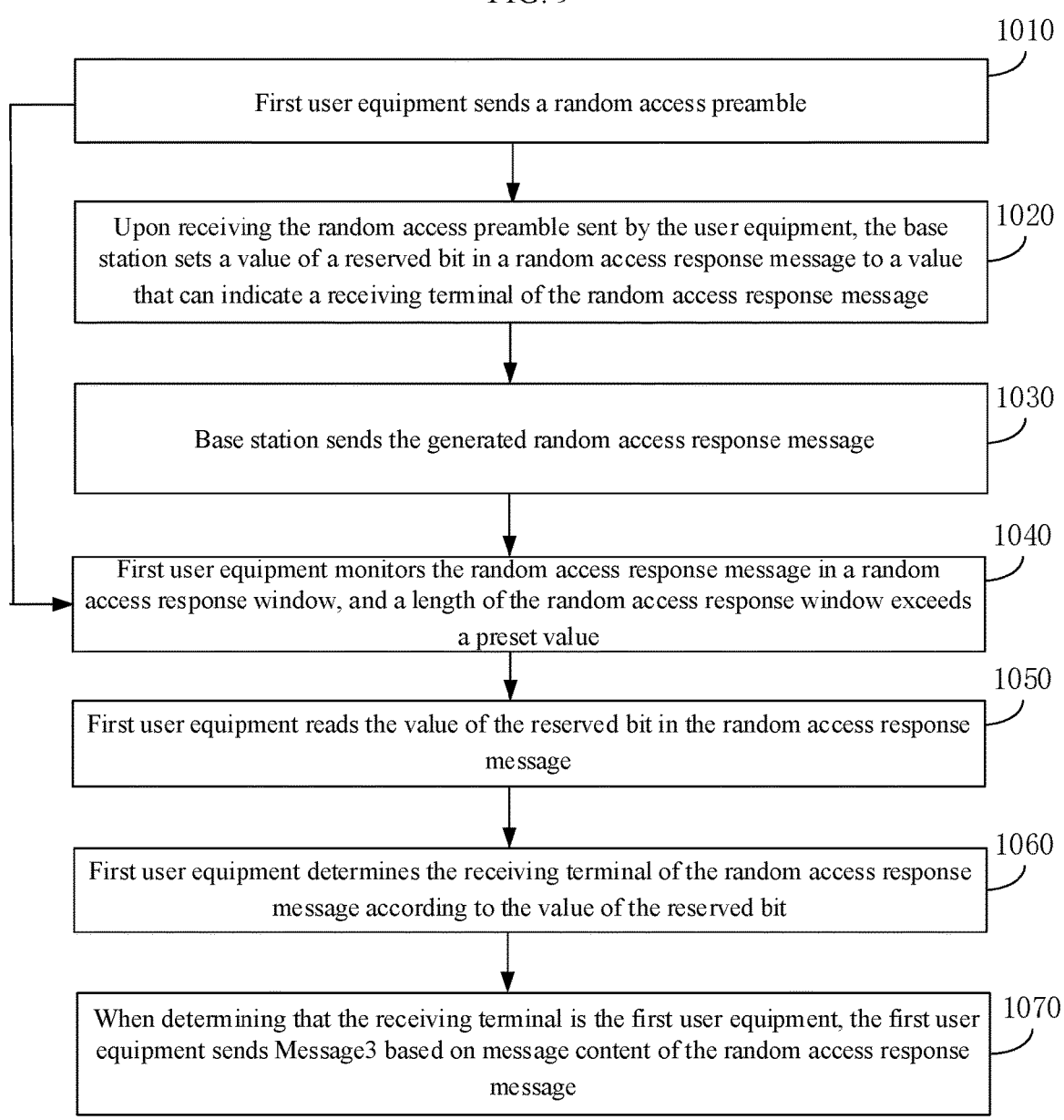
FIG. 10 is a flowchart of interaction between a base station and a user equipment in a random access method according to an example.

FIG. 10 is a flowchart of interaction between a base station and a user equipment in a random access method according to an example. In this example, referring to the descriptions in FIGS. 1A-2 and FIG. 9 provided by the examples of the present disclosure, the technical solution of interaction between a base station and a first user equipment to realize the UE accessing the base station in a NR-U system will be described as an example. As shown in FIG. 10, the method includes the following steps.

At step 1010, a first user equipment sends a random access preamble, and step 1020 and step 1040 are performed.

At step 1020, upon receiving the random access preamble sent by the user equipment, the base station sets a value of a reserved bit in a random access response message to a value that can indicate a receiving terminal of the random access response message.

At step 1030, the base station sends a generated random access response message.

At step 1040, the first user equipment monitors the random access response message in a random access response window, and a length of the random access response window exceeds a preset value.

In an example, the preset value can be the length of one radio frame, and the length of the radio frame is 10 ms. Therefore, the length of the random access response window in the present disclosure is greater than 10 ms, for example, the length of the random access response window can be 12 ms, 15 ms, and so on.

At step 1050, the first user equipment reads the value of the reserved bit in the random access response message.

At step 1060, the first user equipment determines the receiving terminal of the random access response message according to the value of the reserved bit.

At step 1070, if it is determined that the receiving terminal is the first user equipment, the first user equipment sends Message3 based on message content of the random access response message.

In this example, after the UE supporting NR-U sends a random access preamble for random access, if a random access response message is monitored in the random access response window, the UE can read the value of the reserved bit to obtain the receiving terminal, so that the UE that needs to receive the RAR can still be uniquely identified when the length of the random access response window is larger than the preset value, thereby improving the access success rate for the UE which supports NR-U performing random access when competition for unlicensed frequency band resources is fierce.

Figure 11:
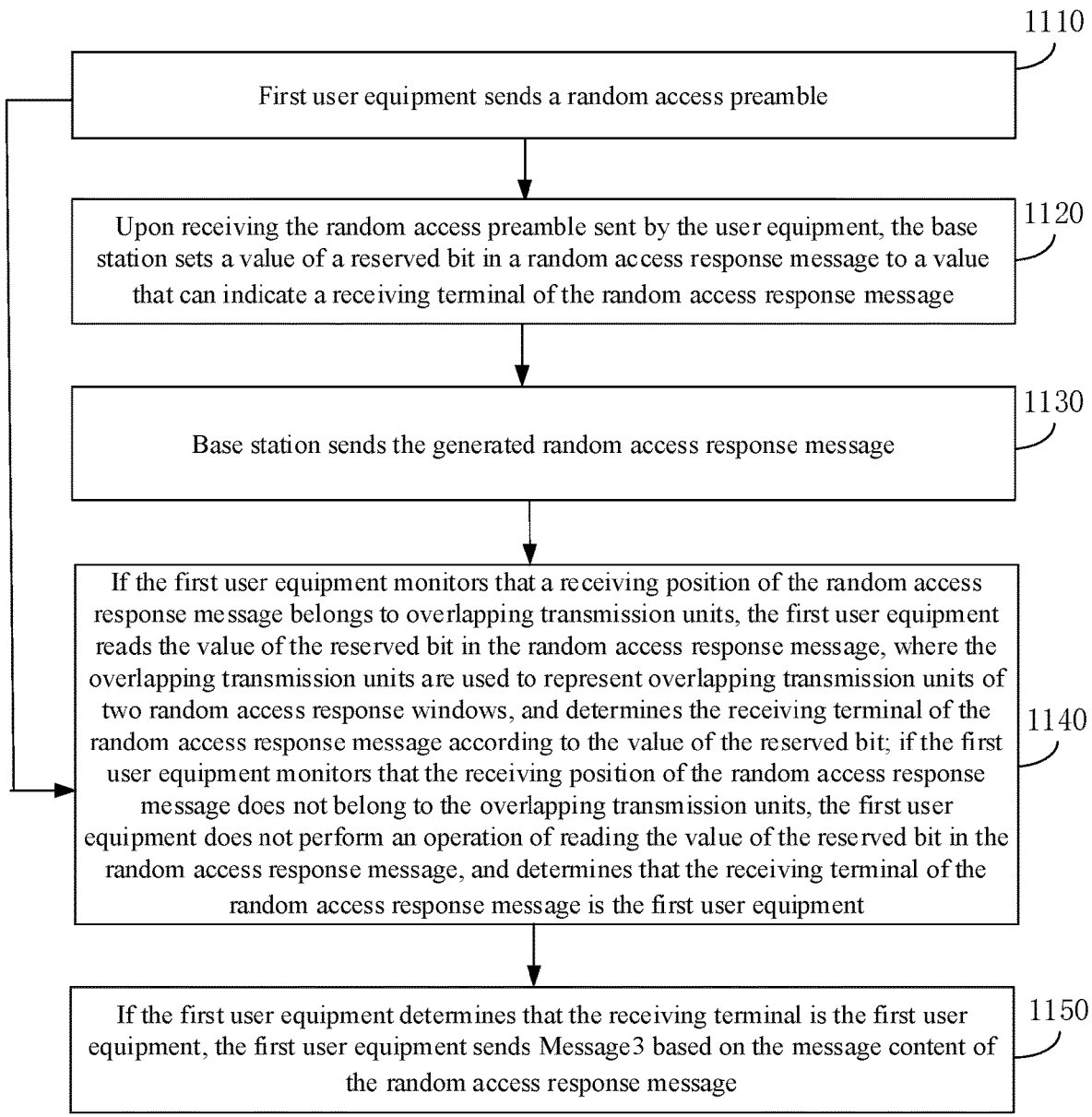
FIG. 11 is a flowchart illustrating another interaction between a base station and a user equipment in a random access method according to an example.

FIG. 11 is a flowchart illustrating another interaction between a base station and a user equipment in a random access method according to an example. In this example, referring to the descriptions in FIGS. 3, 4, and 9 provided by the examples of the present disclosure, the technical solution of interaction between a base station and a first user equipment to realize the UE accessing the base station in a NR-U system will be described as an example. As shown in FIG. 11, the method includes the following steps.

At step 1110, a first user equipment sends a random access preamble, and step 1120 and step 1140 are performed.

At step 1120, upon receiving the random access preamble sent by the user equipment, the base station sets a value of a reserved bit in a random access response message to a value that can indicate a receiving terminal of the random access response message.

At step 1130, the base station sends a generated random access response message.

At step 1140, if the first user equipment monitors that a receiving position of the random access response message belongs to overlapping transmission units, the first user equipment reads the value of the reserved bit in the random access response message, where the overlapping transmission units are used to represent transmission units overlapped between two random access response windows, and determines the receiving terminal of the random access response message according to the value of the reserved bit; if the first user equipment monitors that the receiving position of the random access response message does not belong to the overlapping transmission units, the first user equipment does not perform an operation of reading the value of the reserved bit in the random access response message, and determines that the receiving terminal of the random access response message is the first user equipment.

At step 1150, if the first user equipment determines that the receiving terminal is the first user equipment, the first user equipment sends Message3 based on the message content of the random access response message.

In this example, after the UE supporting NR-U sends a random access preamble for random access, if a random access response message is monitored in the random access response window, the UE can read the value of the reserved bit to obtain the receiving terminal, so that the UE that needs to receive the RAR can still be uniquely identified when the length of the random access response window is larger than the preset value, thereby improving the access success rate for the UE which supports NR-U performing random access when competition for unlicensed frequency band resources is fierce.

Figure 12:
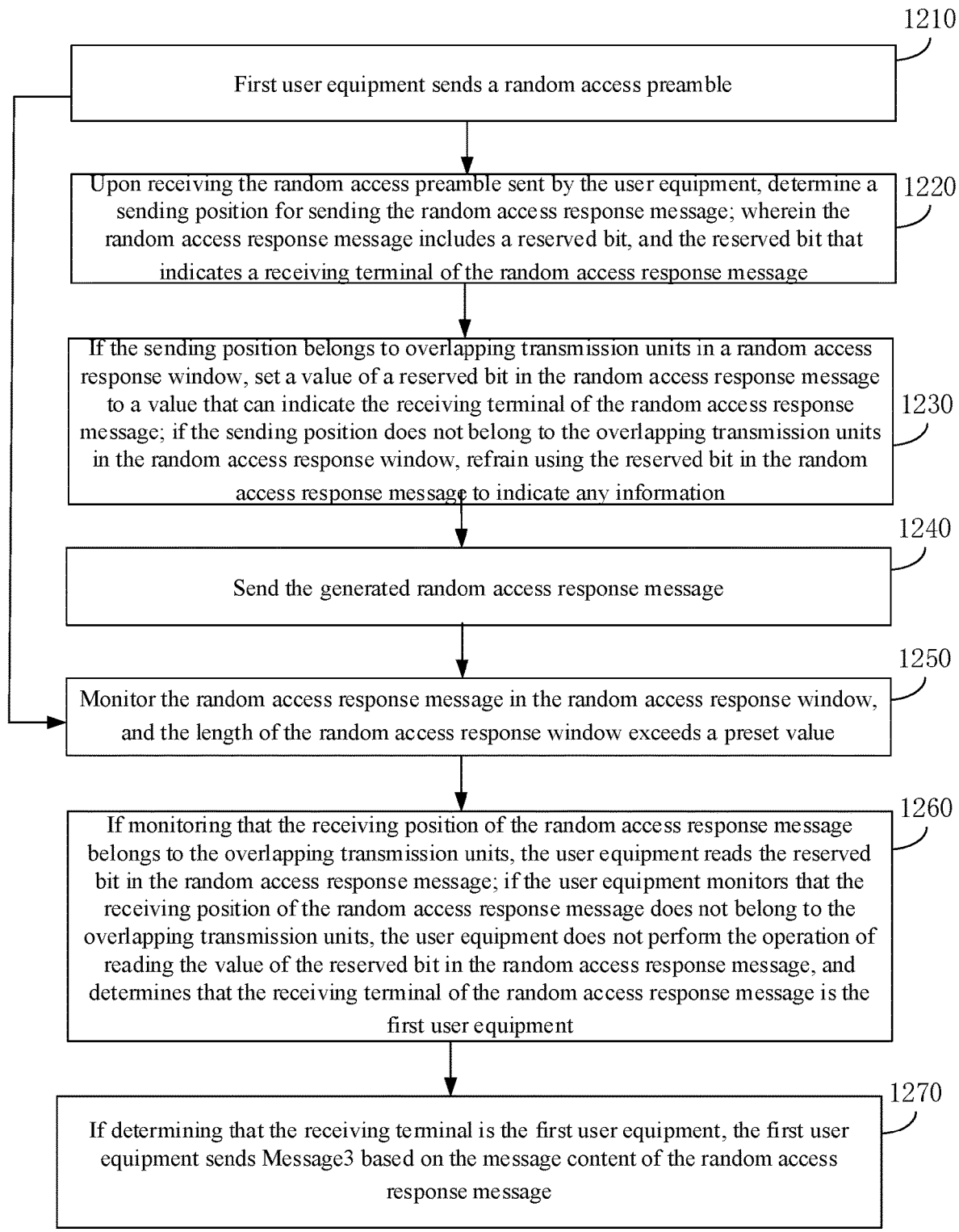
FIG. 12 is a flowchart illustrating another interaction between a base station and a user equipment in a random access method according to an example.

FIG. 12 is a flowchart illustrating another interaction between a base station and a user equipment in a random access method according to an example. In this example, referring to the descriptions in FIGS. 5, 6, and 7 provided by the examples of the present disclosure, the technical solution of interaction between a base station and a first user equipment to realize the UE accessing the base station in a NR-U system will be described as an example. As shown in FIG. 12, the method includes the following steps.

At step 1210, a first user equipment sends a random access preamble, and step 1220 and step 1250 are performed.

At step 1220, upon receiving the random access preamble sent by the user equipment, a sending position for sending the random access response message is determined.

At step 1230, if the sending position belongs to overlapping transmission units in a random access response window, a value of a reserved bit in the random access response message is set to a value that can indicate the receiving terminal of the random access response message; if the sending position does not belong to the overlapping transmission units in the random access response window, the reserved bit in the random access response message is refrained to be used to indicate any information.

At step 1240, a generated random access response message is sent.

At step 1250, the first user equipment monitors the random access response message in the random access response window, and the length of the random access response window exceeds a preset value, and step 1260 is performed.

In an example, the random access response message includes a reserved bit, and the reserved bit is used to indicate the receiving terminal of the random access response message. Since the receiving terminal can be clearly determined when the RAR is transmitted in the non-overlapping transmission units, in this example, the base station does not use reserved bit to indicate the receiving terminal when sending the RAR in the non-overlapping transmission units of the random access response window. Therefore, when the RAR is received in the non-overlapping transmission units, the user equipment cannot determine the receiving terminal through the reserved bit, but the user equipment can directly determine that the receiving terminal is the user equipment itself.

At step 1260, if the user equipment monitors that the receiving position of the random access response message belongs to the overlapping transmission units, the user equipment reads the reserved bit in the random access response message; if the user equipment monitors that the receiving position of the random access response message does not belong to the overlapping transmission units, the user equipment does not perform the operation of reading the value of the reserved bit in the random access response message, and determines that the receiving terminal of the random access response message is the first user equipment.

At step 1270, if the first user equipment determines that the receiving terminal is the first user equipment, the first user equipment sends Message3 based on the message content of the random access response message.

In this example, after the UE supporting NR-U sends a random access preamble for random access, if a random access response message is monitored in overlapping transmission units of the random access response window, since the base station uses the reserved bit of the random access response message to indicate the receiving terminal, the UE can read the value of the reserved bit to obtain the receiving terminal, so that the UE that needs to receive the RAR can still be uniquely identified when the length of the random access response window is larger than the preset value. However, when the random access response message is monitored in the non-overlapping transmission units of the random access response window, since the base station side does not use the reserved bit of the random access response message to indicate the receiving terminal, the user equipment directly determines the receiving terminal.

Figure 13:
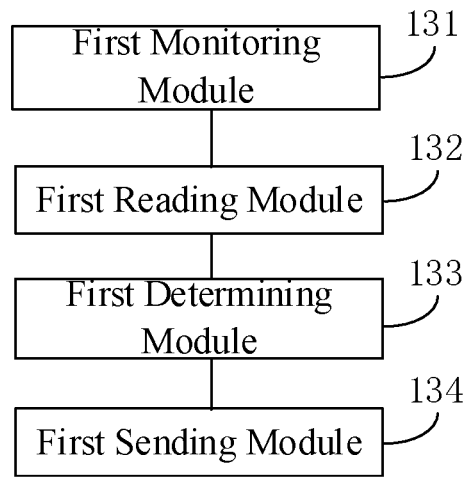
FIG. 13 is a block diagram illustrating an apparatus for random access according to an example.

FIG. 13 is a block diagram illustrating an apparatus for random access according to an example, applied to a first user equipment supporting New Radio access to unlicensed spectrum. As shown in FIG. 13, the apparatus for random access includes:

a first monitoring module 131 configured to, after sending a random access preamble, monitor a random access response message in a random access response window, wherein a length of the random access response window exceeds a preset value, the random access response message includes a reserved bit, and the reserved bit is used to indicate a receiving terminal of the random access response message;

a first reading module 132 configured to read a value of the reserved bit in the random access response message;

a first determining module 133 configured to determine the receiving terminal of the random access response message according to the value of the reserved bit;

a first sending module 134 configured to, if determining that the receiving terminal is the first user equipment, send a Message3 based on message content of the random access response message.

Figure 14:
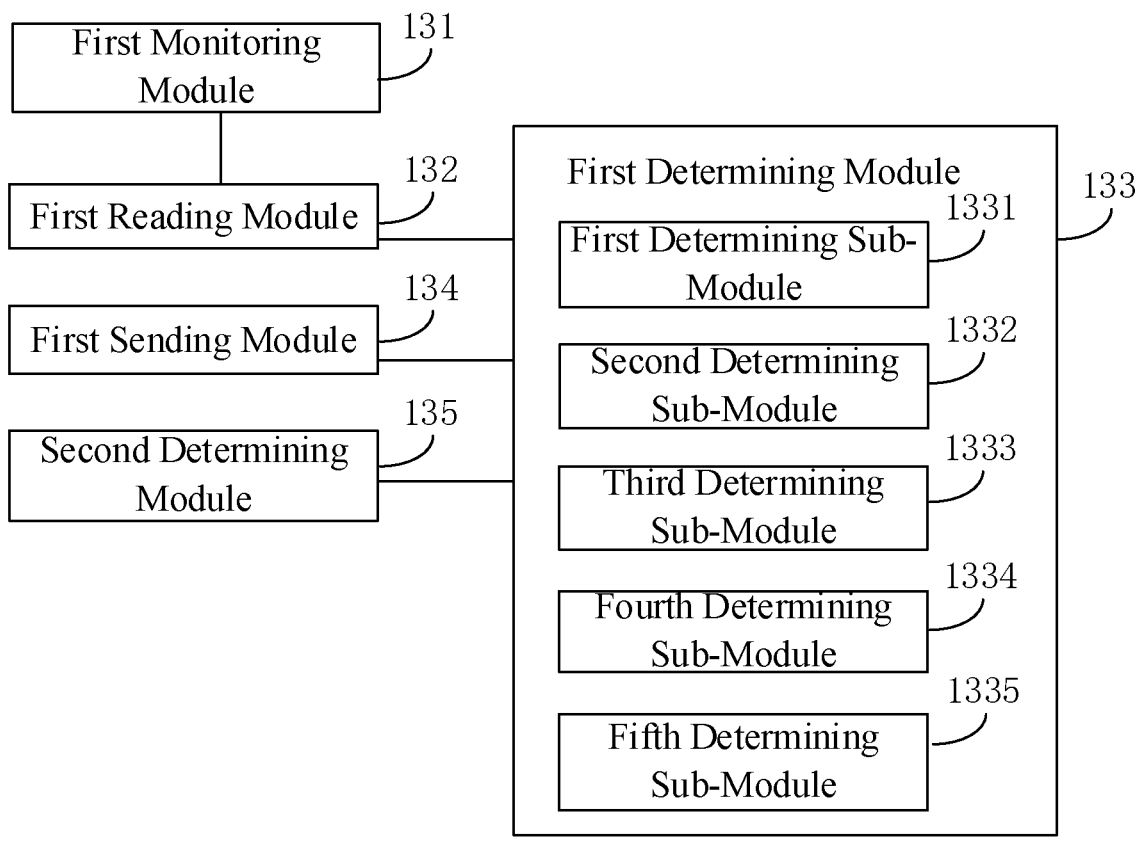
FIG. 14 is a block diagram illustrating another apparatus for random access according to an example.

FIG. 14 is a block diagram illustrating another apparatus for random access according to an example. As shown in FIG. 14, based on the example shown in FIG. 13, in an example, if the receiving position where the random access response message is monitored belongs to overlapping transmission units, and the overlapping transmission units are used to represent transmission units overlapped between two random access response windows, the first determining module 133 includes:

a first determining sub-module 1331 configured to, if the receiving position is first Q transmission units of the random access response window, and the value of the reserved bit indicates that the receiving terminal is a user equipment of a current radio frame, determine that the receiving terminal of the random access response message is the first user equipment;

a second determining sub-module 1332 configured to, if the receiving position is the first Q transmission units of the random access response window, and the value of the reserved bit indicates that the receiving terminal is the user equipment of a previous radio frame, determine that the receiving terminal of the random access response message is not the first user equipment;

a third determining sub-module 1333 configured to, if the receiving position is last Q transmission units of the random access response window, and the value of the reserved bit indicates that the receiving terminal is the user equipment of the previous radio frame, determine that the receiving terminal of the random access response message is the first user equipment;

a fourth determining sub-module 1334 configured to, if the receiving position is the last Q transmission units of the random access response window, and the value of the reserved bit indicates that the receiving terminal is the user equipment of the current radio frame, determine that the receiving terminal of the random access response message is not the first user equipment, wherein both of the first Q transmission units and the last Q transmission units belong to overlapping transmission units.

In an example, if the receiving position where the random access response message is monitored belongs to overlapping transmission units, the first determining module 133 includes:

a fifth determining sub-module 1335 configured to, if the value of the reserved bit indicates that the receiving terminal is the user equipment of the current radio frame, determine that the receiving terminal of the random access response message is the first user equipment.

In an example, the apparatus also includes:

a second determining module 135 configured to, if determining that the receiving terminal is not the first user equipment, determine that the random access fails.

Figure 15:
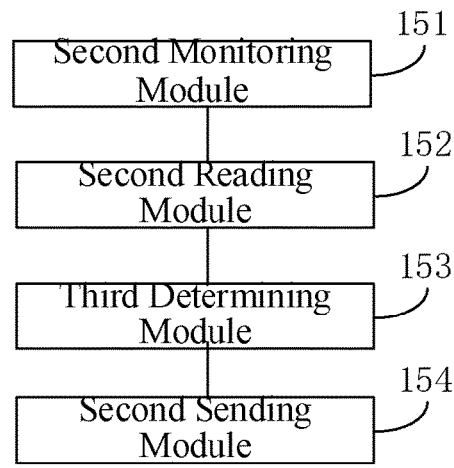
FIG. 15 is a block diagram illustrating an apparatus for random access according to an example.

FIG. 15 is a block diagram illustrating another apparatus for random access according to an example, applied to a first user equipment supporting New Radio access to unlicensed spectrum. As shown in FIG. 15, the apparatus for random access includes:

a second monitoring module 151 configured to, after sending a random access preamble, monitor a random access response message in a random access response window, wherein a length of the random access response window exceeds a preset value, the random access response message includes a reserved bit, and the reserved bit is used to indicate a receiving terminal of the random access response message;

a second reading module 152 configured to, if the receiving position where the random access response message is monitored belongs to overlapping transmission units, read a value of the reserved bit in the random access response message, wherein the overlapping transmission units are used to represent transmission units overlapped between two random access response windows;

a third determining module 153 configured to determine the receiving terminal of the random access response message according to the value of the reserved bit;

a second sending module 154 configured to, if determining that the receiving terminal is the first user equipment, send a Message3 based on message content of the random access response message.

Figure 16:
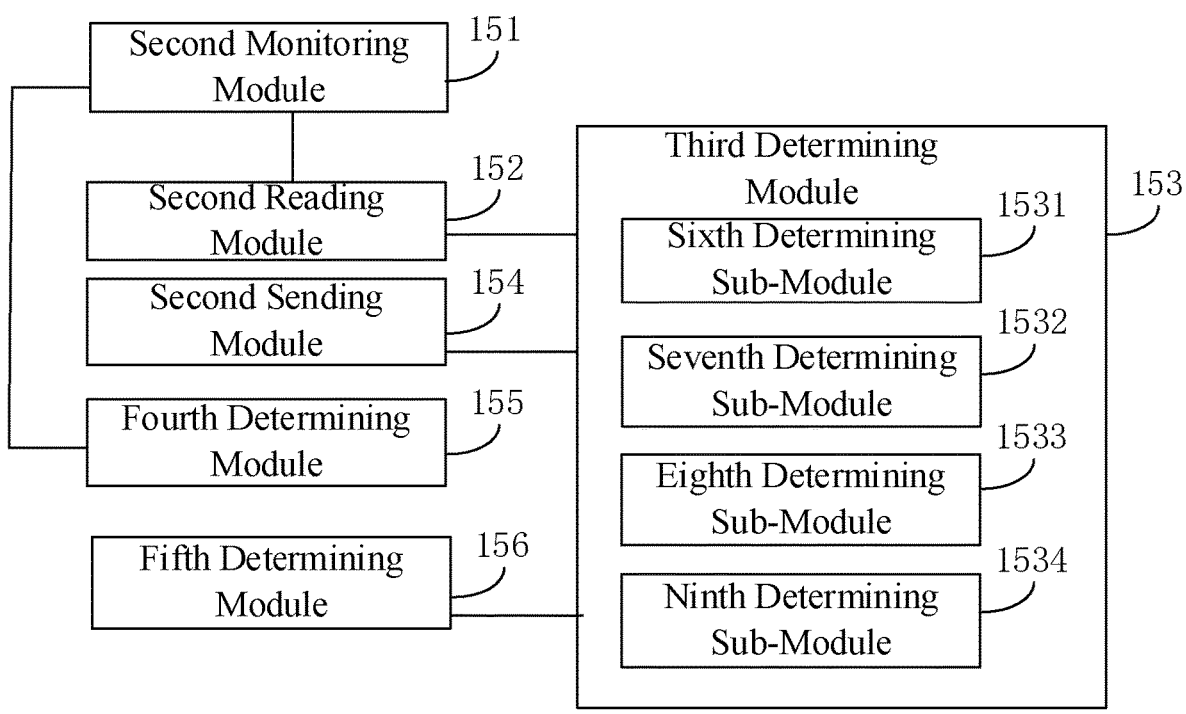
FIG. 16 is a block diagram illustrating another apparatus for random access according to an example.

FIG. 16 is a block diagram illustrating another apparatus for random access according to an example. As shown in FIG. 16, based on the example shown in FIG. 15, in an example, the apparatus includes:

a fourth determining module 155 configured to, if the receiving position where the random access response message is monitored does not belong to overlapping transmission units, refrain the operation of reading the value of the reserved bit in the random access response message, and determine that the receiving terminal of the random access response message is the first user equipment.

In an example, the third determining module 153 includes:

a sixth determining sub-module 1531 configured to, if the receiving position is first Q transmission units of the random access response window, and the value of the reserved bit indicates that the receiving terminal is a user equipment of a current radio frame, determine that the receiving terminal of the random access response message is the first user equipment;

a seventh determining sub-module 1532 configured to, if the receiving position is the first Q transmission units of the random access response window, and the value of the reserved bit indicates that the receiving terminal is the user equipment of a previous radio frame, determine that the receiving terminal of the random access response message is not the first user equipment;

an eighth determining sub-module 1533 configured to, if the receiving position is last Q transmission units of the random access response window, and the value of the reserved bit indicates that the receiving terminal is the user equipment of the previous radio frame, determine that the receiving terminal of the random access response message is the first user equipment;

a ninth determining sub-module 1534 configured to, if the receiving position is the last Q transmission units of the random access response window, and the value of the reserved bit indicates that the receiving terminal is the user equipment of the current radio frame, determine that the receiving terminal of the random access response message is not the first user equipment, wherein both of the first Q transmission units and the last Q transmission units belong to overlapping transmission units.

In an example, the apparatus also includes:

a fifth determining module 156 configured to, if determining that the receiving terminal is not the first user equipment, determine that the random access fails.

Figure 17:
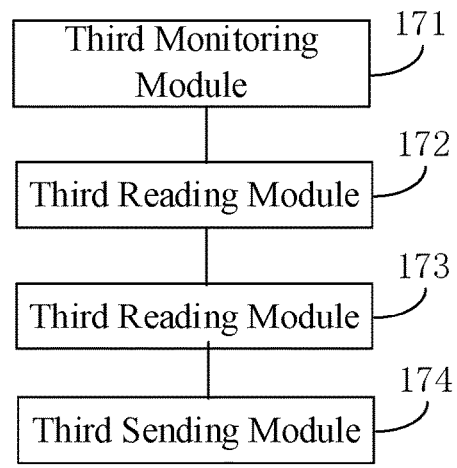
FIG. 17 is a block diagram illustrating an apparatus for random access according to an example.

FIG. 17 is a block diagram illustrating another apparatus for random access according to an example, applied to a first user equipment supporting New Radio access to unlicensed spectrum. As shown in FIG. 17, the apparatus for random access includes:

a third monitoring module 171 configured to, after sending a random access preamble, monitor a random access response message in a random access response window, wherein a length of the random access response window exceeds a preset value;

a third reading module 172 configured to, if the receiving position where the random access response message is monitored belongs to overlapping transmission units, read the reserved bit in the random access response message, wherein the reserved bit is used to indicate a receiving terminal of the random access response message, and the overlapping transmission units are used to represent transmission units overlapped between two random access response windows;

a third reading module 173 configured to determine the receiving terminal of the random access response message according to the value of the reserved bit;

a third sending module 174 configured to, if determining that the receiving terminal is the first user equipment, send a Message3 based on message content of the random access response message.

Figure 18:
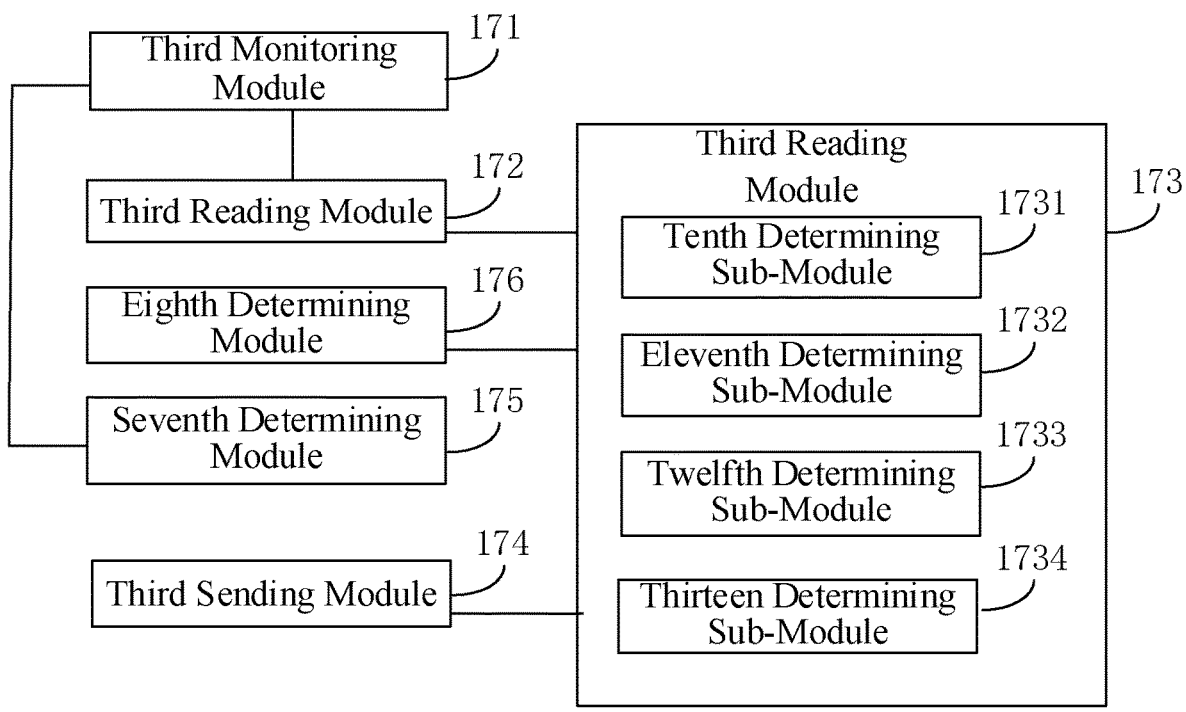
FIG. 18 is a block diagram illustrating another apparatus for random access according to an example.

FIG. 18 is a block diagram illustrating another apparatus for random access according to an example. As shown in FIG. 18, based on the example shown in FIG. 17, in an example, the apparatus includes:

a seventh determining module 175 configured to, if the receiving position where the random access response message is monitored does not belong to overlapping transmission units, refrain the operation of reading the value of the reserved bit in the random access response message, and determine that the receiving terminal of the random access response message is the first user equipment.

In an example, the sixth determining module 173 includes:

a tenth determining sub-module 1731 configured to, if the receiving position is first Q transmission units of the random access response window, and the value of the reserved bit indicates that the receiving terminal is a user equipment of a current radio frame, determine that the receiving terminal of the random access response message is the first user equipment;

an eleventh determining sub-module 1732 configured to, if the receiving position is the first Q transmission units of the random access response window, and the value of the reserved bit indicates that the receiving terminal is the user equipment of a previous radio frame, determine that the receiving terminal of the random access response message is not the first user equipment;

a twelfth determining sub-module 1733 configured to, if the receiving position is last Q transmission units of the random access response window, and the value of the reserved bit indicates that the receiving terminal is the user equipment of the previous radio frame, determine that the receiving terminal of the random access response message is the first user equipment;

a thirteen determining sub-module 1734 configured to, if the receiving position is the last Q transmission units of the random access response window, and the value of the reserved bit indicates that the receiving terminal is the user equipment of the current radio frame, determine that the receiving terminal of the random access response message is not the first user equipment, wherein both of the first Q transmission units and the last Q transmission units belong to overlapping transmission units.

In an example, the apparatus also includes:

an eighth determining module 176 configured to, if the receiving terminal is not the first user equipment, determine that the random access fails.

Figure 19:
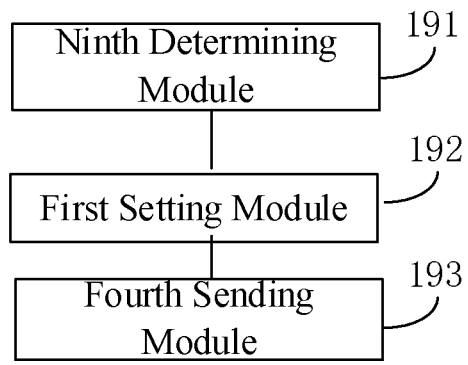
FIG. 19 is a block diagram illustrating an apparatus for random access according to an example.

FIG. 19 is a block diagram illustrating another apparatus for random access according to an example, applied to a base station supporting New Radio access to unlicensed spectrum. As shown in FIG. 19, the apparatus for random access includes:

a ninth determining module 191 configured to, after receiving a random access preamble sent by a user equipment, determine a sending position for sending a random access response message, wherein the random access response message includes a reserved bit, and the reserved bit is used to indicate a receiving terminal of the random access response message;

a first setting module 192 configured to, if the sending position belongs to overlapping transmission units of the random access response window, set a value of the reserved bit in the random access response message to a value that can indicate the receiving terminal of the random access response message;

a fourth sending module 193 configured to send a generated random access response message.

Figure 20:
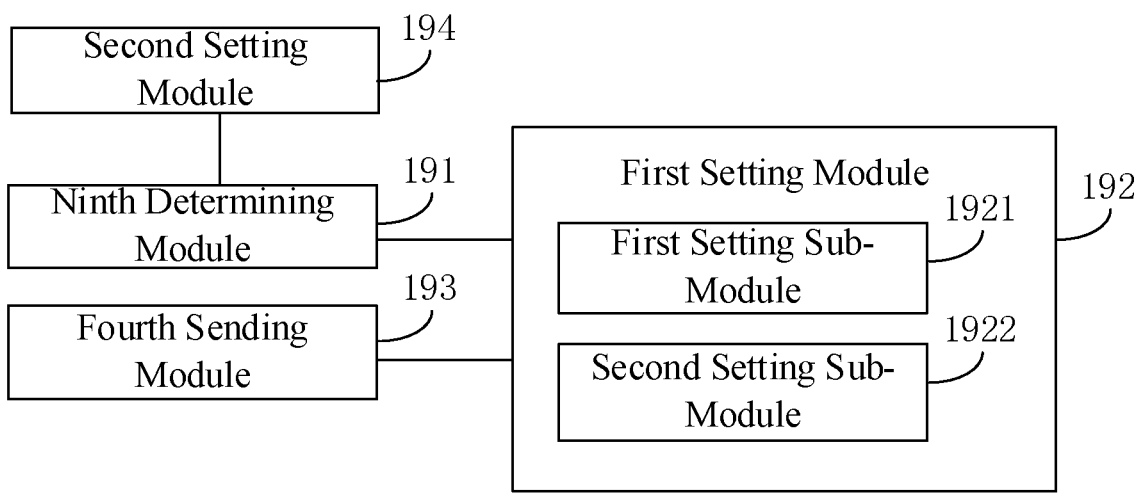
FIG. 20 is a block diagram illustrating another apparatus for random access according to an example.

FIG. 20 is a block diagram illustrating another apparatus for random access according to an example. As shown in FIG. 20, based on the example shown in FIG. 19, in an example, the first setting module 192 includes:

a first setting sub-module 1921 configured to, if the overlapping transmission units to which the receiving position belong locates at first Q transmission units of the random access response window, set the value of the reserved bit to a value indicating that the receiving terminal is the user equipment of the current radio frame;

a second setting sub-module 1922 configured to, if the overlapping transmission unit to which the receiving position belong locates at last Q transmission units of the random access response window, set the value of the reserved bit to a value indicating that the receiving terminal is the user equipment of the previous radio frame, wherein both of the first Q transmission units and the last Q transmission units belong to overlapping transmission units.

In an example, the apparatus also includes:

a second setting module 194 configured to, if the sending position does not belong to the overlapping transmission units in the random access response window, refrain using the reserved bit in the random access response message to indicate any information.

Figure 21:
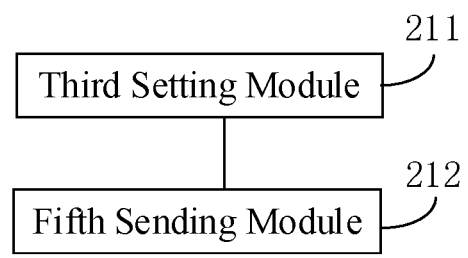
FIG. 21 is a block diagram illustrating an apparatus for random access according to an example.

FIG. 21 is a block diagram illustrating an apparatus for random access according to an example, applied to a base station supporting New Radio access to unlicensed spectrum. As shown in FIG. 21, the apparatus for random access includes:

a third setting module 211 configured to, after receiving a random access preamble sent by a user equipment, set a value of a reserved bit in the random access response message to a value indicating a receiving terminal of the random access response message;

a fifth sending module 212 configured to send a generated random access response message.

Figure 22:
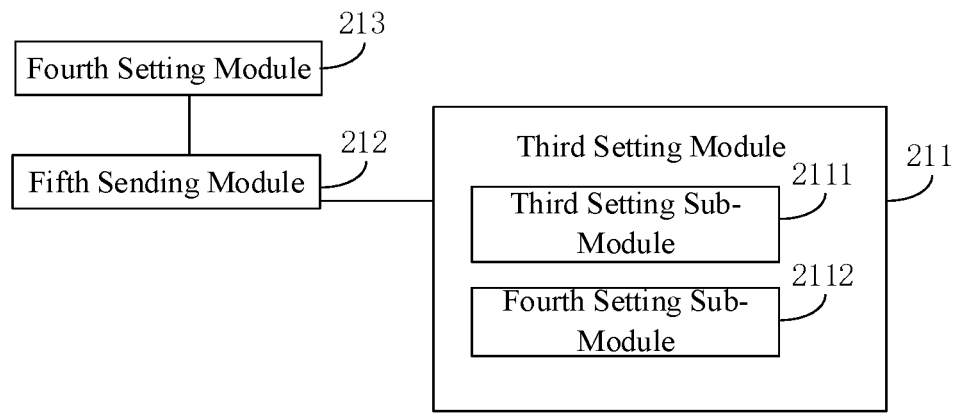
FIG. 22 is a block diagram illustrating another apparatus for random access according to an example.

FIG. 22 is a block diagram illustrating another apparatus for random access according to an example. As shown in FIG. 22, based on the example shown in FIG. 21, in an example, the third setting module 211 includes:

a third setting sub-module 2111 configured to, if the overlapping transmission unit to which the receiving position belongs locates at first Q transmission units of the random access response window, set the value of the reserved bit to a value indicating that the receiving terminal is the user equipment of the current radio frame;

a fourth setting sub-module 2112 configured to, if the overlapping transmission unit to which the receiving position belong locates at last Q transmission units of the random access response window, set the value of the reserved bit to a value indicating that the receiving terminal is the user equipment of the previous radio frame, wherein both of the first Q transmission units and the last Q transmission units belong to overlapping transmission units.

In an example, the apparatus also includes:

a fourth setting module 213 configured to, if the sending position does not belong to the overlapping transmission units in the random access response window, set the value of the reserved bit in the random access response message to a value indicating that the receiving terminal of the random access response message is the user equipment of the current radio frame.

Since the apparatus embodiment substantially corresponds to the method embodiment, reference may be made to part of the descriptions of the method embodiment for the related part. The device embodiment described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

The present disclosure also provides a non-transitory computer-readable storage medium on which a computer program is stored, and the computer program is used to perform the method for random access described in any one of FIGS. 1A to 2 above.

The present disclosure also provides a non-transitory computer-readable storage medium on which a computer program is stored, and the computer program is used to perform the method for random access described in any one of FIGS. 3 to 4 above.

The present disclosure also provides a non-transitory computer-readable storage medium on which a computer program is stored, and the computer program is used to perform the method for random access described in any one of FIGS. 5 to 6 above.

The present disclosure also provides a non-transitory computer-readable storage medium on which a computer program is stored, and the computer program is used to perform the method for random access described in any one of FIGS. 7 to 8 above.

The present disclosure also provides a non-transitory computer-readable storage medium on which a computer program is stored, and the computer program is used to perform the method for random access described in FIG. 9 above.

The present disclosure also provides an apparatus for random access, applied to a first user equipment supporting New Radio access to unlicensed spectrum, including:
a processor;
a memory for storing processor executable instructions;
wherein the processor is configured to:
after sending a random access preamble, monitor a random access response message in a random access response window, wherein a length of the random access response window exceeds a preset value, the random access response message includes a reserved bit, and the reserved bit is used to indicate a receiving terminal of the random access response message;
read a value of the reserved bit in the random access response message;
determine the receiving terminal of the random access response message according to the value of the reserved bit;
if determining that the receiving terminal is the first user equipment, send a Message3 based on message content of the random access response message.

The present disclosure also provides an apparatus for random access, applied to a first user equipment supporting New Radio access to unlicensed spectrum, including:
a processor;
a memory for storing processor executable instructions;
wherein the processor is configured to:
after sending a random access preamble, monitor a random access response message in a random access response window, wherein a length of the random access response window exceeds a preset value, the random access response message includes a reserved bit, and the reserved bit is used to indicate a receiving terminal of the random access response message;
if the receiving position where the random access response message is monitored belongs to overlapping transmission units, read a value of the reserved bit in the random access response message, wherein the overlapping transmission units are used to represent transmission units overlapped between two random access response windows;
determine the receiving terminal of the random access response message according to the value of the reserved bit;
if determining that the receiving terminal is the first user equipment, send a Message3 based on message content of the random access response message.

The present disclosure also provides an apparatus for random access, applied to a first user equipment supporting New Radio access to unlicensed spectrum, including:
a processor;
a memory for storing processor executable instructions;
wherein the processor is configured to:
after sending a random access preamble, monitor a random access response message in a random access response window, wherein a length of the random access response window exceeds a preset value;
if the receiving position where the random access response message is monitored belongs to overlapping transmission units, read the reserved bit in the random access response message, wherein the reserved bit is used to indicate a receiving terminal of the random access response message, and the overlapping transmission units are used to represent transmission units overlapped between two random access response windows;
determine the receiving terminal of the random access response message according to the value of the reserved bit;
if determining that the receiving terminal is the first user equipment, send a Message3 based on message content of the random access response message.

The present disclosure also provides an apparatus for random access, applied to a first user equipment supporting New Radio access to unlicensed spectrum, including:
a processor;
a memory for storing processor executable instructions;
wherein the processor is configured to:
after receiving a random access preamble sent by a user equipment, determine a sending position for sending a random access response message, wherein the random access response message includes a reserved bit, and the reserved bit is used to indicate a receiving terminal of the random access response message;
if the sending position belongs to overlapping transmission units of the random access response window, set a value of the reserved bit in the random access response message to a value that can indicate the receiving terminal of the random access response message;
send a generated random access response message.

The present disclosure also provides an apparatus for random access, applied to a first user equipment supporting New Radio access to unlicensed spectrum, including:

a processor;

a memory for storing processor executable instructions;

wherein the processor is configured to:

after receiving a random access preamble sent by a user equipment, set a value of a reserved bit in the random access response message to a value indicating a receiving terminal of the random access response message;

send a generated random access response message.

Figure 23:
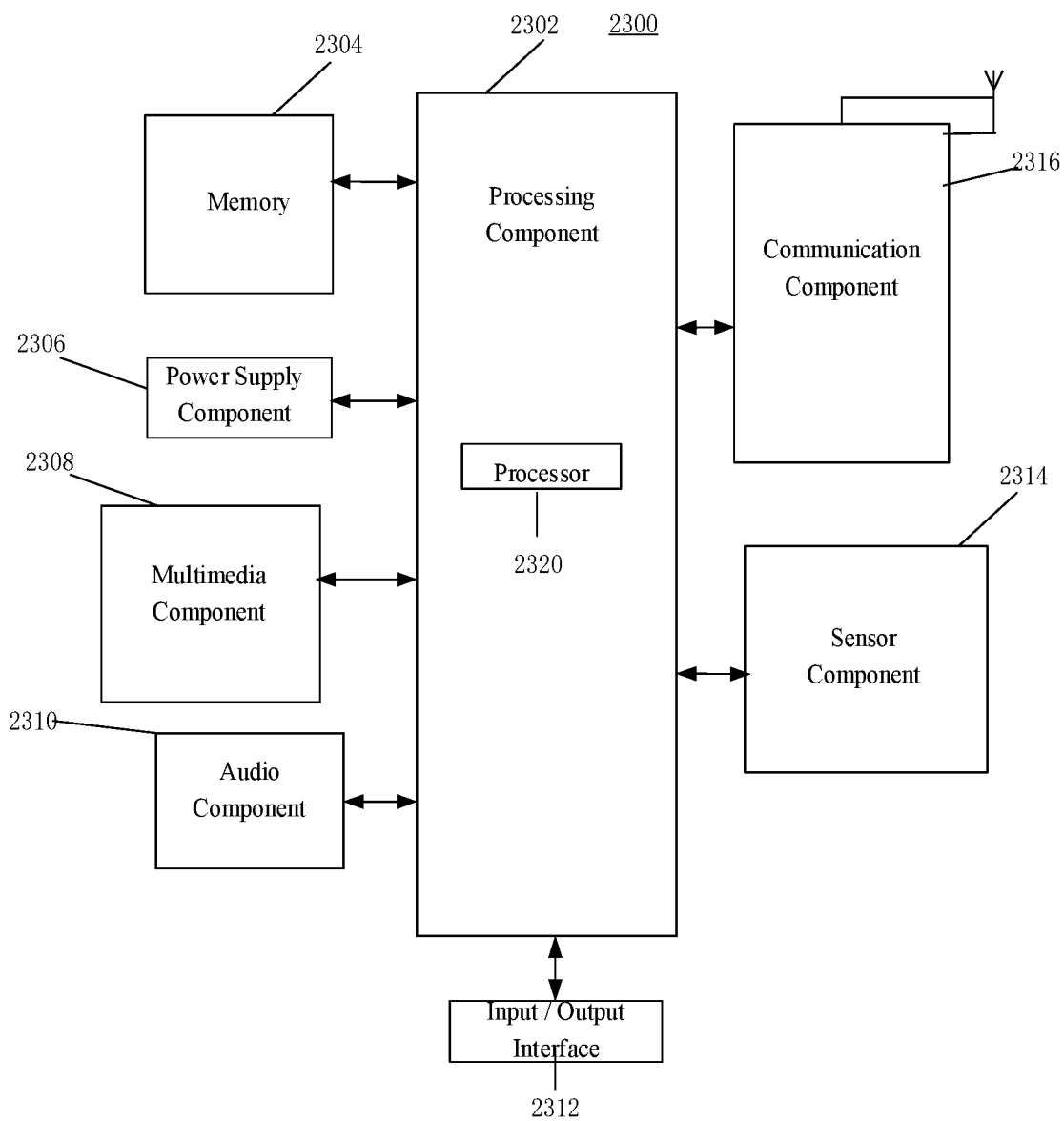
FIG. 23 is a block diagram illustrating a device adapted for random access according to an example.

FIG. 23 is a block diagram illustrating a structure of an apparatus for random access according to an example. As shown in FIG. 23, an apparatus 2300 for random access is shown according to an example. The apparatus 2300 can be a terminal, such as a computer, a mobile phone, a digital broadcasting terminal, a messaging device, a game console, a tablet device, a medical device, fitness equipment, a personal digital assistant, or the like.

As shown in FIG. 23, the apparatus 2300 can include one or more of the following components: a processing component 2301, a memory 2302, a power supply component 2303, a multimedia component 2304, an audio component 2305, an input/output (I/O) interface 2306, a sensor component 2307, and a communication component 2308.

The processing component 2301 generally controls overall operations of the apparatus 2300, such as operations associated with display, phone calls, data communications, camera operations, and recording operations. The processing component 2301 can include one or more processors 2308 to execute instructions to complete all or part of the steps of the above methods. In addition, the processing component 2301 can include one or more modules which facilitate the interaction between the processing component 2301 and other components. For example, the processing component 2301 can include a multimedia module to facilitate the interaction between the multimedia component 2304 and the processing component 2301.

The memory 2302 is to store various types of data to support the operation of the apparatus 2300. Examples of such data include instructions for any application or method operated on the apparatus 2300, contact data, phonebook data, messages, pictures, videos, and so on. The memory 2302 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2303 supplies power for different components of the apparatus 2300. The power supply component 2303 can include a power supply management system, one or more power supplies, and other components associated with generating, managing and distributing power for the apparatus 2300.

The multimedia component 2304 includes a screen providing an output interface between the apparatus 2300 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 2304 can include a front camera and/or a rear camera. The front camera and/or rear camera can receive external multimedia data when the apparatus 2300 is in an operating mode, such as a photographing mode or a video mode. Each of the front camera and the rear camera can be a fixed optical lens system or have focal length and optical zooming capability.

The audio component 2305 is to output and/or input an audio signal. For example, the audio component 2305 includes a microphone (MIC). When the apparatus 2300 is in an operating mode, such as a call mode, a record mode and a voice recognition mode, the microphone is to receive an external audio signal. The received audio signal can be further stored in the memory 2302 or sent via the communication component 2308. In some examples, the audio component 2305 further includes a speaker for outputting an audio signal.

The I/O interface 2306 provides an interface between the processing component 2301 and a peripheral interface module. The above peripheral interface module can be a keyboard, a click wheel, buttons, or the like. These buttons can include but not limited to, a home button, a volume button, a start button and a lock button.

The sensor component 2307 includes one or more sensors to provide status assessments of various aspects for the apparatus 2300. For example, the sensor component 2307 can detect the on/off status of the apparatus 2300, and relative positioning of component, for example, the component is a display and a keypad of the apparatus 2300. The sensor component 2307 can also detect a change in position of the apparatus 2300 or a component of the apparatus 2300, a presence or absence of the contact between a user and the apparatus 2300, an orientation or an acceleration/deceleration of the apparatus 2300, and a change in temperature of the apparatus 2300. The sensor component 2307 can include a proximity sensor to detect the presence of a nearby object without any physical contact. The sensor component 2307 can further include an optical sensor, such as a Complementary Metal-Oxide-Semiconductor (CMOS) or Charged Coupled Device (CCD) image sensor which is used in imaging applications. In some examples, the sensor component 2307 can further include an acceleration sensor, a gyroscope sensor, a magnetic sensor, a pressure sensor, or a temperature sensor.

The communication component 2308 is to facilitate wired or wireless communication between the apparatus 2300 and other devices. The apparatus 2300 can access a wireless network based on a communication standard, such as Wi-Fi, 2G, or 3G, or a combination thereof. In an example, the communication component 2308 receives a broadcast signal or broadcast related information from an external broadcast management system via a broadcast channel. In an example, the communication component 2308 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the apparatus 2300 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above method for random access on the user equipment side.

In an example, a non-transitory computer readable storage medium including instructions is further provided, such as the memory 2302 including instructions. The above instructions can be executed by the processor 2308 of the apparatus 2300 to complete the above method. For example, the non-transitory computer readable storage medium can be a Read-Only Memory (ROM), a Random Access Memory (RAM), a CD-ROM, a magnetic tape, a floppy disk, an optical data storage device, and so on.

It should be understood that the present disclosure is not limited to the precise structure described above and shown in the drawings, and various modifications and changes can be made without departing from its scope. The scope of the present disclosure is only limited by the appended claims.

Figure 24:
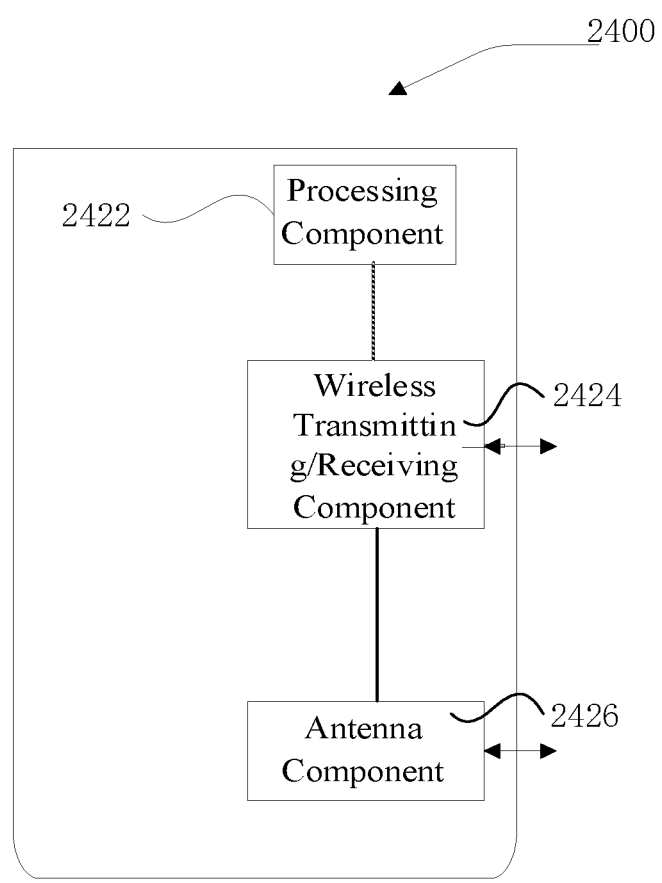
FIG. 24 is a block diagram illustrating a device adapted for random access according to an example.

FIG. 24 is a schematic structural diagram of an apparatus 2400 adaptable for random access according to an example. As shown in FIG. 24, the apparatus 2400 can be provided as a base station. Referring to FIG. 24, the apparatus 2400 includes a processing component 2422, a wireless transmitting/receiving component 2424, an antenna component 2426, and a signal processing section specific to a wireless interface. The processing component 2422 can further include one or more processors.

One of the processors in the processing component 2422 can be configured to perform the above method for random access on the base station side.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A random access method, applied to a first user equipment supporting new radio access to unlicensed spectrum, comprising:
after sending a random access preamble, monitoring a random access response message in a random access response window, wherein a length of the random access response window exceeds a preset value, the random access response message comprises a reserved bit that indicates a receiving terminal of the random access response message;
reading a value of the reserved bit in the random access response message;
determining the receiving terminal of the random access response message according to the value of the reserved bit; and
in response to determining that the receiving terminal is the first user equipment, sending random access message 3 based on a message content of the random access response message;
wherein in response to that a receiving position where the random access response message is monitored belongs to overlapping transmission units which represent transmission units overlapped between two random access response windows,
determining the receiving terminal of the random access response message according to the value of the reserved bit comprises:
in response to that the receiving position locates at first Q transmission units of the random access response window and the value of the reserved bit indicates that the receiving terminal is a user equipment corresponding to a current radio frame, determining that the receiving terminal of the random access response message is the first user equipment;
in response to that the receiving position locates at the first Q transmission units of the random access response window and the value of the reserved bit indicates that the receiving terminal is the user equipment corresponding to a previous radio frame, determining that the receiving terminal of the random access response message is not the first user equipment;
in response to that the receiving position locates at last Q transmission units of the random access response window and the value of the reserved bit indicates that the receiving terminal is the user equipment corresponding to the previous radio frame determining that the receiving terminal of the random access response message is the first user equipment; and
in response to that the receiving position locates at the last Q transmission units of the random access response window and the value of the reserved bit indicates that the receiving terminal is the user equipment corresponding to the current radio frame, determining that the receiving terminal of the random access response message is not the first user equipment,
wherein both of the first Q transmission units and the last Q transmission units belong to the overlapping transmission units.

2. The method according to claim 1, wherein in response to that a receiving position where the random access response message is monitored does not belong to overlapping transmission units,
determining the receiving terminal of the random access response message according to the value of the reserved bit comprises:
in response to that the value of the reserved bit indicates that the receiving terminal is the user equipment corresponding to the current radio frame, determining that the receiving terminal of the random access response message is the first user equipment.

3. The method according to claim 1, further comprising:
in response to determining that the receiving terminal is not the first user equipment, determining that the random access fails.

4. The method of claim 1, wherein in response to that a receiving position where the random access response message is monitored belongs to overlapping transmission units, reading a value of the reserved bit in the random access response message, wherein the overlapping transmission units represent transmission units overlapped between two random access response windows.

5. A non-transitory computer-readable storage medium storing computer instructions thereon, wherein the computer program is used to perform the method for random access according to claim 4.

6. A communication system implementing the method of claim 1, comprising the user equipment, wherein when there are overlapping transmission units in the random access response window among different user equipment, at least one of the user equipment that needs to receive random access response is still capable of being uniquely identified in the overlapping transmission units, thereby improving access success rate for the user equipment supporting new radio access to unlicensed spectrum performing random access when competing for unlicensed frequency band resources.

7. The communication system of claim 6, further comprising a base station supporting new radio access to unlicensed spectrum, wherein the base station is configured to:
   after receiving a random access preamble sent by the user equipment, determine the sending position for sending a random access response message, wherein the random access response message comprises the reserved bit that indicates a receiving terminal of the random access response message;
   in response to that the sending position belongs to overlapping transmission units of a random access response window, set a value of the reserved bit in the random access response message to a value indicating the receiving terminal of the random access response message; and
   send the generated random access response message.

8. The method according to claim 1, further comprising:
   in response to that the receiving position where the random access response message is monitored does not belong to the overlapping transmission units, refraining the operation of reading the value of the reserved bit in the random access response message, and determining that the receiving terminal of the random access response message is the first user equipment, wherein the overlapping transmission units represent transmission units overlapped between two random access response windows.

9. An apparatus implementing the method of claim 1, applied to a first user equipment supporting New Radio access to unlicensed spectrum, the apparatus comprising:
   a processor;
   a memory for storing processor executable instructions;
   wherein the processor is configured to perform steps of the method.

10. An apparatus implementing the method of claim 4, applied to a first user equipment supporting New Radio access to unlicensed spectrum, the apparatus comprising:
   a processor;
   a memory for storing processor executable instructions;
   wherein the processor is configured to perform steps of the method.

11. A non-transitory computer-readable storage medium storing computer instructions thereon, wherein the computer program is used to perform the method for random access according to claim 1.

12. A random access method, applied to a base station supporting new radio access to unlicensed spectrum, comprising:
   after receiving a random access preamble sent by a user equipment, determining a sending position for sending a random access response message, wherein the random access response message comprises a reserved bit that indicates a receiving terminal of the random access response message;
   in response to that the sending position belongs to overlapping transmission units of a random access response window, setting a value of the reserved bit in the random access response message to a value indicating the receiving terminal of the random access response message; and
   sending the generated random access response message;
   wherein in response to that the receiving position belongs to the overlapping transmission units of the random access response window, setting the value of the reserved bit in the random access response message to the value indicating the receiving terminal of the random access response message comprises:
   in response to that an overlapping transmission unit to which the sending position belongs locates at first Q transmission units of the random access response window setting the value of the reserved bit to a value indicating that the receiving terminal is a user equipment corresponding to the current radio frame; and
   in response to that the overlapping transmission unit to which the sending position belongs locates at last Q transmission units of the random access response window, setting the value of the reserved bit to a value indicating that the receiving terminal is a user equipment corresponding to the previous radio frame,
   wherein both of the first Q transmission units and the last Q transmission units belong to the overlapping transmission units.

13. An apparatus implementing the method of claim 12, applied to a base station supporting New Radio access to unlicensed spectrum, the apparatus comprising:
   a processor;
   a memory for storing processor executable instructions;
   wherein the processor is configured to perform steps of the method.

14. The method according to claim 12, further comprising:
   in response to that the sending position does not belong to the overlapping transmission units in the random access response window, refraining using the reserved bit in the random access response message to indicate any information.

15. A random access method, applied to a base station supporting new radio access to unlicensed spectrum, comprising:
   after receiving a random access preamble sent by a user equipment, setting a value of a reserved bit in a random access response message to a value indicating a receiving terminal of the random access response message; and
   sending the generated random access response message;
   wherein setting the value of the reserved bit in the random access response message to the value indicating the receiving terminal of the random access response message comprises:
   in response to that an overlapping transmission unit to which a sending position belongs locates at first Q transmission units of the random access response window, setting the value of the reserved bit to a value indicating that the receiving terminal is a user equipment corresponding to the current radio frame; and
   in response to that the overlapping transmission unit to which the sending position belongs locates at last Q transmission units of the random access response window setting the value of the reserved bit to a value indicating that the receiving terminal is a user equipment corresponding to the previous radio frame,
   wherein both of the first Q transmission units and the last Q transmission units belong to overlapping transmission units.

16. An apparatus implementing the method of claim 15, applied to a base station supporting New Radio access to unlicensed spectrum, the apparatus comprising:
- a processor;
- a memory for storing processor executable instructions;
- wherein the processor is configured to perform steps of the method.

17. The method according to claim 15, further comprising:
- in response to that the sending position does not belong to overlapping transmission units in the random access response window, setting the value of the reserved bit in the random access response message to a value indicating that the receiving terminal of the random access response message is the user equipment corresponding to the current radio frame.

* * * * *